(12) United States Patent
Fischer et al.

(10) Patent No.: US 12,265,033 B2
(45) Date of Patent: Apr. 1, 2025

(54) METHOD, COMPUTER PROGRAM AND APPARATUS FOR DETERMINING POSITIONS OF MOLECULES IN A SAMPLE

(71) Applicant: ABBERIOR INSTRUMENTS GMBH, Gottingen (DE)

(72) Inventors: Joachim Fischer, Karlsruhe (DE); Matthias Henrich, Heidelberg (DE); Winfried Willemer, Bovenden (DE)

(73) Assignee: ABBERIOR INSTRUMENTS GMBH, Gottingen (DE)

( * ) Notice: Subject to any disclaimer, the term of this patent is extended or adjusted under 35 U.S.C. 154(b) by 339 days.

(21) Appl. No.: 17/991,447

(22) Filed: Nov. 21, 2022

(65) Prior Publication Data

US 2023/0101017 A1   Mar. 30, 2023

Related U.S. Application Data

(63) Continuation-in-part of application No. PCT/EP2021/063788, filed on May 25, 2021.

(30) Foreign Application Priority Data

May 26, 2020   (DE) ................. 10 2020 113 998.5

(51) Int. Cl.
*G01N 21/64* (2006.01)
*G02B 21/36* (2006.01)

(52) U.S. Cl.
CPC ..... *G01N 21/6458* (2013.01); *G01N 21/6428* (2013.01); *G02B 21/361* (2013.01); *G02B 21/365* (2013.01)

(58) Field of Classification Search
CPC .......... G01N 21/6458; G01N 21/6428; G02B 21/361; G02B 21/365; G02B 5/1809; G02B 21/004; G02B 21/0076; G02B 21/16
See application file for complete search history.

(56) References Cited

U.S. PATENT DOCUMENTS 11,754,847 B2 *  9/2023  Engelhardt ............ G02B 21/16
                                                            250/362
11,885,948 B2 *  1/2024  Heintzmann ...... G02B 21/0032
(Continued)

FOREIGN PATENT DOCUMENTS

CN     108181235 A    6/2018
CN     110632045 A   12/2019
(Continued)

OTHER PUBLICATIONS

International Search Report for PCT/EP2021/063788 dated Sep. 14, 2021.
(Continued)

*Primary Examiner* — David P Porta
*Assistant Examiner* — Meenakshi S Sahu
(74) *Attorney, Agent, or Firm* — MOSER TABOADA

(57) ABSTRACT

The present disclosure relates to method, computer programs with instructions, and apparatus for determining positions of two or more spaced-apart molecules in one or more spatial directions in a sample by means of a localization microscope. The present disclosure also relates to localization microscopes using such an apparatus. Light distributions arising due to interference of coherent light are used for determining the positions of the molecules. In the method, a plurality of light distributions are generated (S1) using a first light modulator having a plurality of switchable pixels. The first light modulator is arranged in an image plane of the localization microscope. Each light distribution has a local intensity minimum and regions with an intensity increase adjacent thereto. Each of the two or more molecules is illuminated (S2) with one light distribution. For each of the light distributions, photons emitted by the molecules are detected (S4) for different positionings of the light distribution. The light distributions are positioned (S3) indepen- (Continued)

dently of each other. Based on the photons detected for the different positionings of the light distributions, the positions of the molecules are finally derived (S5).

25 Claims, 18 Drawing Sheets

(56) References Cited

U.S. PATENT DOCUMENTS

| | | | |
|---|---|---|---|
| 2006/0176542 A1 | 8/2006 | Muro et al. | |
| 2014/0042340 A1* | 2/2014 | Hell | G01N 15/1434 250/459.1 |
| 2015/0226950 A1 | 8/2015 | Booth et al. | |
| 2017/0123197 A1 | 5/2017 | Reuss et al. | |
| 2018/0056603 A1 | 3/2018 | Hensleigh et al. | |
| 2019/0234879 A1 | 8/2019 | Balzarotti et al. | |
| 2019/0234882 A1 | 8/2019 | Balzarotti et al. | |
| 2019/0235220 A1 | 8/2019 | Balzarotti et al. | |
| 2020/0150446 A1 | 5/2020 | Thibon et al. | |
| 2021/0190691 A1 | 6/2021 | Sirat | |
| 2023/0168199 A1 | 6/2023 | Sirat | |

FOREIGN PATENT DOCUMENTS

| | | |
|---|---|---|
| DE | 10063276 C2 | 11/2002 |
| DE | 102007025688 A1 | 12/2007 |
| DE | 112011103187 T5 | 7/2013 |
| DE | 102013114860 B3 | 5/2015 |
| DE | 112014001147 T5 | 11/2015 |
| DE | 102015002205 A1 | 8/2016 |
| DE | 102011055367 B4 | 2/2017 |
| DE | 102020113998 A1 | 12/2021 |
| DE | 102018127281 A1 | 4/2022 |
| EP | 1662296 A1 | 5/2006 |
| EP | 2801854 B1 | 7/2017 |
| EP | 2389606 B1 | 8/2019 |
| SU | 1374922 A1 | 7/1991 |
| WO | WO 2021053245 A1 | 3/2021 |
| WO | WO 2021111187 A1 | 6/2021 |

OTHER PUBLICATIONS

Francisco Balzarotti et al., Nanometer resolution imaging and tracking of fluorescent molecules with minimal photon fluxes, SCIENCE, Dec. 22, 2016, 85 pages, vol. 355, Issue 6325.

M. G. L. Gustafsson, Surpassing the lateral resolution limit by a factor of two using structured illumination microscopy, Journal of Microscopy, May 2000, pp. 82-87., vol. 198, Pt 2.

Mats G. L. Gustafsson, Nonlinear structured-illumination microscopy: Wide-field fluorescence imaging with theoretically unlimited resolution, PNAS, Sep. 13, 2005, 13081-13086, vol. 102 No. 37.

Lusheng Gu et al., Molecular resolution imaging by repetitive optical selective exposure, Nature Methods, 40 pages, www.nature.com/naturemethods, https://doi.org/10.1038/s41592-019-0544-2.

Loïc Reymond et al., SIMPLE: Structured illumination based point localization estimator with enhanced precision, Optics Express, Aug. 19, 2019, 13 pages, vol. 27, No. 17.

Jelmer Cnossen et al., Localization microscopy at doubled precision with patterned illumination, bioRxiv, Feb. 20, 2019, 45 pages, http://dx.doi.org/10.1101/554337.

Andrew G. York et al., Resolution Doubling in Live, Multicellular Organisms Multifocal Structured Illumination Microscopy, NIH Public Access, Author Manuscript, Nat Methods, Jan. 1, 2013, pp. 749-754, doi:10.1038/nmeth.2025.

Siwei Li et al., Rapid 3D image scanning microscopy with multi-spot excitation and double-helix point spread function detection, Optics Express, Sep. 3, 2018, vol. 26, No. 18, 9 pages, https://doi.org/10.1364/OE.26.023585.

Meiqi Li et al., Structured illumination microscopy using digital micro-mirror device and coherent light source, Applied Physics Letters, Jun. 9, 2020, 8 pages, scitation.org/journal/apl, https://doi.org/10.1063/5.0008264.

Egidijus Auksorius et al., Stimulated emission depletion microscopy with a supercontinuum source and fluorescence lifetime imaging, Optics Letters, Jan. 15, 2008, 4 pages, vol. 33, No. 2, https://www.researchgate.net/publication/5654737.

Mateusz Szatkowski et al., Generation of composite vortex beams by independent Spatial Light Modulator pixel addressing, Optics Communications, Sep. 26, 2019, 8 pages, https://doi.org/10.1016/j.optcom.2020.125341.

* cited by examiner

METHOD, COMPUTER PROGRAM AND APPARATUS FOR DETERMINING POSITIONS OF MOLECULES IN A SAMPLE

CROSS-REFERENCE TO RELATED APPLICATIONS

The present application is a continuation-in-part application and claims priority to and the benefit of International Patent Application No. PCT/EP2021/063788, filed on May 25, 2021, the entire contents of which is incorporated herein by reference, and which claims priority to German Application No. DE 10 2020 113 998.5 filed on May 26, 2020.

BACKGROUND OF THE INVENTION a. Field of the Invention

The present disclosure relates to methods, computer programs with instructions, and apparatus for determining positions of molecules in a sample. More particularly, the present disclosure relates to methods, computer programs with instructions, and apparatus for determining positions of two or more spaced-apart molecules in one or more spatial directions in a sample by means of a localization microscope, wherein light distributions arising due to interference of coherent light are used for determining the positions of the molecules. The present disclosure also relates to localization microscopes using such an apparatus.

b. Description of the Prior Art

MINFLUX microscopy is a technical implementation of localization microscopy. The localization of fluorophores in a sample is performed by means of structured excitation light distributions. The designation MINFLUX is derived from the underlying concept of determining the coordinates of a molecule with a minimal number of fluorescence photons (MINimal emission FLUXes). The basic feature of MINFLUX microscopy is that the excitation of the fluorophores is done in such a way that a fluorophore to be localized is always placed close to or in a minimum of the excitation light distribution, which is ideally a zero point, where the excitation light distribution adjacent to the minimum must have a region with an intensity increase. This provides a better utilization of the fluorescence photons with respect to obtaining information about the position of the respective emitting fluorophore. This also applies to applications in which the movement of fluorophores is to be tracked over time. Basic principles of MINFLUX microscopy are known from DE 10 2011 055 367 B4, US 2014/0042340 A1, and DE 10 2013 114 860 B3.

DE 10 2011 055 367 B4 describes a method for tracking a movement of a particle in a sample. In the method, the particle is driven by light to emit photons, and photons emitted by the particle are registered. In this process, the light is directed onto the sample with an intensity distribution that has a spatially limited minimum. The minimum is tracked to the particle moving in the sample by shifting the intensity distribution relative to the sample such that a rate of photons emitted by the particle remains minimal.

In US 2014/0042340 A1 it is additionally described that images can be obtained from the tracks of tracked particles based on the dwell times of the particles in sections of the sample. It is further described in this document that for tracking particles, a combination of an excitation light distribution with a switch-off light distribution, in particular a distribution of light that deactivates excited fluorophores by stimulated emission, can also be usefully employed. Here, local central minima of both light distributions should coincide. When tracking the particle, which is always located in the common minimum of both light distributions, other fluorophores that enter the area of influence of the light distributions are prevented from emitting fluorescent light, so that the tracking of the particle to be tracked is not disturbed.

DE 10 2013 114 860 B3 describes a method for determining the locations of individual molecules of a substance in a sample. The individual molecules are in a fluorescent state and are excited with excitation light to emit fluorescent light, wherein an intensity distribution of the excitation light has at least one zero point. The fluorescent light from the excited individual molecules is registered for different positions of the at least one zero point of the intensity distribution of the excitation light. Then, the locations of the individual molecules are derived from the variation of the intensity of the fluorescent light over the positions of the at least one zero point of the intensity distribution of the excitation light.

Based on these fundamentals, a number of refinements for information retrieval have emerged. A detailed description of MINFLUX microscopy can be found in "Nanometer resolution imaging and tracking of fluorescent molecules with minimal photon fluxes" by F. Balzarotti et al [1]. Basically, in order to localize a fluorophore using MINFLUX microscopy, the intensity minimum or zero point must be placed at a plurality of positions relative to the location of the fluorophore. For this, a position of the fluorophore has to be estimated with a first, lower accuracy in a preparatory step. This can be done by means of ordinary localization microscopy, such as PALM (Photoactivated Localization Microscopy) or STORM (Stochastic Optical Reconstruction Microscopy), or by means of other known (localization) microscopy approaches, such as those based on the application of structured illumination. An intensity distribution of excitation light is then placed at a known position chosen such that the fluorophore is close to the minimum of the intensity distribution. The fluorescence response of the fluorophore is measured. The same is repeated for one or more other positions of the intensity distribution. By means of an evaluation of the intensity ratios similar to a triangulation procedure, the position of the fluorophore can be determined more precisely. Basically, the emission rate increases the further the fluorophore is from the excitation minimum or the further the fluorophore is shifted into a region with an intensity increase. This more accurately determined position can now be used as a starting position for repeating the sequence of steps above, with positions closer to the estimated position of the fluorophore. Particularly with respect to tracking the movement of fluorophores, the change in emission rate as the fluorophore shifts into the region with an intensity increase or toward the minimum can also be used to estimate the shift of the fluorophore.

Some aspects of MINFLUX microscopy are disclosed in US 2019/0235220 A1, US 2019/0234882 A1, and US 2019/0234879 A1.

US 2019/0235220 A1 describes a method for determining the position of the fluorophore, in which only a small or minimal number of positions are required at which an intensity minimum is placed. Intensity increasing regions are adjoining the intensity minimum on both sides in each spatial direction, in which a position of the fluorophore is to be determined.

US 2019/0234882 A1 describes a method in which the location information obtained from a first MINFLUX step is used to place the minimum of the intensity light distribution closer to the fluorophore in a subsequent step in order to derive more precise location information.

US 2019/0234879 A1 describes a method in which the intensity minimum is placed very quickly at a plurality of positions around the estimated location of the fluorophore. A single position is then moved closer to the suspected minimum if an increased emission rate is detected at this position. Such a method is particularly useful for observing the movement of fluorophores.

By means of MINFLUX microscopy, it was possible to experimentally determine the position of fluorophores in two spatial directions with an uncertainty of only 1 nm, i.e., the accuracy of the position determination is comparable to the extension of the fluorophores themselves. If the position of a single fluorophore is to be determined with a given measurement uncertainty, a shorter time is required for this than for position determination using conventional localization microscopy. However, one disadvantage of MINFLUX microscopy is that, up to now, determining the position of a large number of fluorophores has required a large expenditure of time.

In all localization microscopy techniques, the positions of individual fluorophores are determined with high precision. From the set of many such localizations, an image of the sample can then be constructed, which has a resolution much finer than the limiting resolution given by the Abbe limit for wide-field imaging. Such fine resolution microscopy methods are called super-resolution microscopy methods or nanoscopy methods.

Another microscopy technique that allows a resolution slightly below the classical Abbe limit or, more specifically, allows the resolution of structures half as large as after the Abbe limit, is known as SIM (SIM: Structured Illumination Microscopy), e.g. from the article "Surpassing the lateral resolution limit by a factor of two using structured illumination microscopy" by M. G. L. Gustafsson [2]. Here, a sample in wide-field is subjected to a periodically varying intensity distribution whose period corresponds approximately to the diffraction limit of the imaging system. The resulting fluorescence is imaged onto a wide-field detector. The intensity distribution is then shifted relative to the sample by less than the period of the pattern in the sample, typically by one-third of the period, and an image is again acquired. These steps are repeated one more time. The acquired fluorescence images differ from each other, wherein this difference results from the known shift of the illumination light distribution relative to the unknown distribution of fluorophores, which is identical for all images. From the set of images, the unknown distribution of fluorophores can be calculated. To obtain a resolution in multiple spatial directions, the grating must be rotated. An extension of this method to at least theoretically unlimited resolution is described under the name SSIM (Saturated Structured Illumination Microscopy) in the article "Nonlinear structure-illumination microscopy: Wide-field fluorescence imaging with theoretically unlimited resolution" by M. G. L. Gustafsson [3].

Another concept to achieve super-resolution is called ROSE (Repetitive Optical Selective Exposure), and is known e.g. from the article "Molecular resolution imaging by repetitive optical selective exposure" by L. Gu et al [4]. In this approach, which combines localization microscopy with structured illumination, isolated fluorescent molecules are sequentially excited with multiple striped intensity distributions, which are based on interference, and are localized based on the sequentially detected fluorescence using ratiometric location determination. This provides about a twofold improvement in localization precision compared to conventional localization microscopy imaging with the same photon budget. To generate the interference fringe patterns, a laser beam is modulated with an amplitude modulator and split. Fast detection is enabled by a switching device in the detection light path, which directs the fluorescence light to the individual intensity distributions of an excitation sequence to different areas of one and the same CCD detector (CCD: Charge Coupled Device), respectively.

The article "SIMPLE: Structured illumination based point localization estimator with enhanced precision" by L. Reymond et al [5] likewise describes an approach that achieves a twofold increase in the localization precision of single molecules compared to conventional centroid estimation methods. SIMPLE, too, combines the SIM concept with ratiometric location estimation by using precise phase-shifted sine wave patterns as nanometric rulers for simultaneous particle localization based on photon number variation over a 20 µm field of view. The sine wave patterns are generated using a micromirror actor. The setup described in this document includes most of the components needed for parallelized MINFLUX microscopy.

The article "Localization microscopy at doubled precision with patterned illumination" by J. Cnossen et al [6] describes an approach, called SIMFLUX, that combines centroid estimation and photon number variations induced by a sinusoidal illumination pattern in a conventional wide-field imaging device to extract position information over a typical micrometer-scale field of view. During localization, in addition to the location information on a camera, information about the particular position of the excitation intensity pattern at the time of detection is also used. The authors state that if the position of the excitation intensity patterns is not shifted over a full period, but only over a smaller range, then in principle the same increase in resolution as with MINFLUX can be achieved. According to the associated Supplementary Note, this applies to fluorophores that have a specific position relative to the central phase of the excitation intensity pattern that is used.

US 2019/0353912 A1 describes a device for beam shaping and scanning. The apparatus includes a digital micromirror device (DMD) having a plurality of micromirrors. The micromirror device can be used to adjust an axial position of a focal point of a laser beam along a propagation direction of the laser beam and a lateral position of the focal point on a plane perpendicular to the direction of movement. The device can be used, for example, in super-resolution microscopy.

SUMMARY OF THE INVENTION

Methods, computer programs and apparatus for determining positions of molecules in a sample are disclosed. Also disclosed are localization microscopes using such an apparatus.

According to one aspect, a method for determining positions of two or more spaced-apart molecules in one or more spatial directions in a sample using a localization microscope, wherein light distributions arising due to interference of coherent light are used for determining the positions of the molecules, comprises:

generating a plurality of light distributions using a first light modulator having a plurality of switchable pixels disposed in an image plane of the localization microscope, each light distribution having a local intensity minimum and regions with an intensity increase adjacent thereto;

illuminating each of the two or more molecules with one light distribution each;

for each of the light distributions, detecting photons emitted by the molecules for different positionings of the light distribution, the light distributions being positioned independently of each other; and deriving the positions of the molecules based on the photons detected for the different positionings of the light distributions.

In accordance with another aspect, a computer program includes instructions that, when executed by a computer, cause the computer to perform the following steps for determining positions of two or more spaced-apart molecules in one or more spatial directions in a sample using a localization microscope, wherein light distributions arising due to interference of coherent light are used for determining the positions of the molecules:

generating a plurality of light distributions using a first light modulator having a plurality of switchable pixels disposed in an image plane of the localization microscope, each light distribution having a local intensity minimum and regions with an intensity increase adjacent thereto;

illuminating each of the two or more molecules with one light distribution each;

for each of the light distributions, detecting photons emitted by the molecules for different positionings of the light distribution, the light distributions being positioned independently of each other; and deriving the positions of the molecules based on the photons detected for the different positionings of the light distributions.

The term computer is to be understood broadly. In particular, it also includes microcontrollers, embedded systems and other processor-based data processing devices.

For example, the computer program may be provided for electronic retrieval or stored on a computer-readable storage medium.

According to another aspect, an apparatus for determining positions of two or more spaced-apart molecules in one or more spatial directions in a sample using a localization microscope, wherein light distributions arising due to interference of coherent light are used for determining the positions of the molecules, comprises:

an operating unit adapted to drive a first light modulator having a plurality of switchable pixels disposed in an image plane of the localization microscope to generate a plurality of independently positionable light distributions, each light distribution having a local intensity minimum and regions with an intensity increase adjacent thereto; and an evaluation unit adapted to derive the positions of the molecules on the basis of photons emitted by the molecules for each of the light distributions for different positionings of the respective light distributions.

In the above solution, a plurality of light distributions is used to parallelize the position determination of molecules or fluorophores by means of a localization microscope. For this purpose, the individual light distributions are generated by means of a light modulator arranged in an image plane of the localization microscope. The light distributions can be positioned independently of each other by controlling the light modulator accordingly. The parallelized detection of the molecules considerably reduces the time required for scanning a sample. The detected molecules or fluorophores must be active at the same time for detection and have a distance that allows simultaneous diffraction-limited detection. A minimum spacing is required for the light distributions. If active molecules in regions of the sample exhibit distances that are too small for this purpose during time intervals, they will not be observed during these time intervals. In the solution according to the invention, molecules or fluorophores are observed that are so far apart that the light distributions do not touch in the observation area. In other words, the light distributions do not conflict or at least not significantly conflict in the observation area, i.e., their influence on one another is sufficiently small to maintain a desired localization accuracy.

MINFLUX microscopy is typically performed with fluorophores that "blink", i.e., switch between fluorescent and non-fluorescent states. This switching between states can occur either purely randomly with fixed ambient conditions, or it can be induced by a switching process, e.g., by a deactivation light or by an activation light, or by a combination of a deactivation light to deactivate all molecules and an activation light by which few molecules are activated. Thus, it is possible that only one fluorophore at a time is capable of fluorescence in a localization region, but overall the entire sample can still be imaged using most of the fluorophores. Suitable fluorophores and methods for switching switchable fluorophores are known to the skilled person. Typical active times are in the range of several milliseconds. Furthermore, so-called "caged dyes" are known. Some caged dyes remain active after activation, i.e., after photo-induced removal of the so-called "cage", until they are bleached.

The arrangement of the light modulator in an image plane has the advantage that shifting the light distributions in the sample is particularly easy and thus quickly achievable by directly imaging structures or patterns on the light modulator in the image plane: The individual shifting of the light distributions corresponds to the individual shifting of the patterns on the light modulator. The displacement required in each case can be calculated very quickly, resulting in a high speed of decision-making.

According to one aspect, one-dimensional or two-dimensional structures are formed by means of the switchable pixels of the first light modulator for generating the light distributions. Preferably, the one-dimensional structures are grating structures and the two-dimensional structures are ring structures. By means of each one-dimensional grating structure, a grating-like light distribution of successive intensity maxima and intensity minima is obtained in the sample, with which the position of, for example, a fluorophore in one spatial direction can be determined.

Well-modulated gratings are obtained when two or more diffraction orders interfere in the sample. When the +1st and −1st diffraction orders interfere, the period is half the period of the grating on the first light modulator, projected into the sample.

In particular, the intensity minimum lying between the central intensity maximum and one of the two adjacent intensity maxima, or the intensity minimum lying between the two brightest intensity maxima can be used for position determination. For position determination in two spatial directions, at least one further light distribution of a different, preferably orthogonal orientation also needs to be provided. It is likewise possible to use more than two different orientations, e.g., three orientations that are each rotated relative to each other by 60°.

The ring structures can be used to obtain a light distribution in the form of a so-called "bottle beam", i.e., a light distribution that has a zero point limited in three spatial directions and with which position determination in three spatial directions is possible. Another possibility is the generation of light distributions in the form of a donut, i.e., light distributions which have a zero point limited in two spatial directions and with which a position determination in two spatial directions is possible. For this purpose, points or discs can be displayed on the first light modulator. In addition, a static or dynamic phase modulator, as known from STED microscopy (STED: Stimulated Emission Depletion), is then used to impose a phase ramp.

While for 1D gratings a continuous grating shows the best modulation in the sample, this does not apply to a periodic arrangement of ring structures. The zero point or the pronounced central minimum arises when ring and hole have matching sizes, so that just on the axis in focus, figuratively speaking, there is a corresponding light ray to each light ray, which cancels with the first-mentioned light ray on the axis in focus.

It has been found that the above condition that the light distributions do not conflict with each other is quite easy to fulfill. In general, the larger the contiguous individual grating structures on the first light modulator, the higher the modulation in the sample. The larger the distance between the individual grating structures, the smaller the influence of the grating structures on each other. In general, grating structures that can be thought of as continuations of each other conflict less with each other than do grating structures that are phase-shifted with respect to each other.

According to one aspect, the structures formed by means of the switchable pixels of the first light modulator are shifted for positioning the light distributions. The displacements of the structures are preferably smaller than dimensions of structural elements of the structures, where the dimensions of the structural elements are larger than a size of the pixels in both dimensions. For example, a grid line formed with the pixels may have a line width of ten pixels. Any shift of the grating lines results in a to-scale shift of the light distribution in the sample.

If a line grating is formed in the sample based on the interference of the +1st and −1st diffraction orders of the first light modulator that are imaged into the sample, then a grating is formed in the sample with half the period that would result from a to-scale imaging of the grating into the sample.

However, the displacement of the grating corresponds directly to the scaled projection of the displacement of the grating into the sample. Thus, if a grating with dark and light stripes of equal width is used, then the spacing of the stripe centers on the first light modulator is twice the stripe width. Thus, if a stripe is ten pixels wide, the pattern can be shifted by $\frac{1}{20}$ of the period. Accordingly, the pattern in the sample then shifts to scale. However, since the period in the sample is half as large, this means that in the sample the pattern is shifted by $\frac{1}{10}$ of the period of the pattern in the sample.

According to one aspect, a method for determining positions of two or more spaced-apart molecules in one or more spatial directions in a sample using a localization microscope, wherein light distributions arising due to interference of coherent light are used for determining the positions of the molecules, comprises:

generating a sequence of light distributions using a first light modulator having a plurality of switchable pixels disposed in an image plane of the localization microscope, each light distribution having local intensity minima and regions with an intensity increase adjacent thereto, wherein subsequent light distributions are locally modified in accordance with estimated positions of the molecules;

illuminating the two or more molecules with the sequence of light distributions;

for each of the light distributions, detecting photons emitted by the molecules; and deriving the positions of the molecules based on the photons detected for the different light distributions.

In accordance with another aspect, a computer program includes instructions that, when executed by a computer, cause the computer to perform the following steps for determining positions of two or more spaced-apart molecules in one or more spatial directions in a sample using a localization microscope, wherein light distributions arising due to interference of coherent light are used for determining the positions of the molecules:

generating a sequence of light distributions using a first light modulator having a plurality of switchable pixels disposed in an image plane of the localization microscope, each light distribution having local intensity minima and regions with an intensity increase adjacent thereto, wherein subsequent light distributions are locally modified in accordance with estimated positions of the molecules;

illuminating the two or more molecules with the sequence of light distributions;

for each of the light distributions, detecting photons emitted by the molecules; and deriving the positions of the molecules based on the photons detected for the different light distributions.

According to another aspect, an apparatus for determining positions of two or more spaced-apart molecules in one or more spatial directions in a sample using a localization microscope, wherein light distributions arising due to interference of coherent light are used for determining the positions of the molecules, comprises:

an operating unit adapted to drive a first light modulator having a plurality of switchable pixels, which is disposed in an image plane of the localization microscope, to generate a sequence of light distributions, each light distribution having local intensity minima and regions with an intensity increase adjacent thereto, wherein subsequent light distributions are locally modified in accordance with estimated positions of the molecules; and an evaluation unit adapted to derive the positions of the molecules on the basis of photons emitted by the molecules for the different light distributions.

In the above solution, a sequence of light distributions is used to parallelize the position determination of molecules or fluorophores by means of a localization microscope. For this purpose, the individual light distributions are generated by means of a light modulator arranged in an image plane of the localization microscope. Subsequent light distributions are locally modified in accordance with estimated positions of the molecules by controlling the light modulator accordingly. The parallelized detection of the molecules considerably reduces the time required for scanning a sample. The local modification of the subsequent light distributions allows avoiding that a molecule is subject to an overly large intensity, thus respecting the MINFLUX principle. According to this solution, the local light distribution around a molecule is still controlled, but the local light distributions used for the different molecules are not fully independent.

According to one aspect, for generating the light distributions a grating structure is formed by means of the switchable pixels of the first light modulator, and wherein subsequent light distributions are locally modified by switching off individual grating lines of the grating structure. In particular, those grating lines or groups of grating lines are switched off that cause an intensity at an estimated position of a molecule that exceeds a threshold. Preferably, a grating structure is formed over the whole area of the first light modulator. This grating structure is interrupted at certain positions, which are related to the estimated positions of the molecules. The estimated positions may, for example, be known with some uncertainty from a previous camera measurement. Estimated positions of further molecules may be obtained during the measurement process.

According to one aspect, the grating structure formed by means of the switchable pixels of the first light modulator is shifted for subsequent light distributions. In this way, the positions of the molecules can be determined with an increasing accuracy based on several measurements. When due to a shift of the grating structure an overly large intensity would result at an estimated position of a molecule, the related grating line or group of grating lines is switched off. It may then be switched on again when the grating structure is shifted further.

In order to obtain a well-modulated fringe pattern in the sample, the light that is used is preferably linearly polarized. The linear polarization is oriented parallel to the direction of the individual bright fringes, i.e. perpendicular to the direction of periodicity of the grating structures. This means that, in order to have a good modulation with intensity minima close to zero or even zero, different polarizations are preferably used for different orientations of the light distributions. For this purpose, the light is preferably suitably polarized using a Pockels cell or other switchable polarization rotating elements.

According to one aspect, a second light modulator for influencing the light distributions is arranged in a Fourier plane of the localization microscope. In particular, the second light modulator is arranged to block individual diffraction orders. By means of the second light modulator, the light distributions generated by the first light modulator can be further influenced in a targeted manner. For example, if several diffraction orders are generated by the first light modulator, the second light modulator can filter out those diffraction orders that are not to be used in the further beam path. For MINFLUX in one plane with one-dimensional grating structures, two orders are preferably used, in particular the +1st and the −1st order. The filtering may be fixed or may be adaptable to the situation so that a high degree of flexibility is achieved.

It is beneficial if the second light modulator for filtering the orders can be switched synchronously with the first light modulator in the image plane, or at least can be switched when the orientation is changed. Thus, if two positions are used for localization in one direction, then it is convenient if it can be switched at least half as fast. If MINFLUX is to be performed iteratively with different structure widths, it is beneficial if the central blocking area of the second light modulator in the Fourier plane can be increased from iteration to iteration.

According to one aspect, the first light modulator is an amplitude modulator or a phase modulator. Preferably, the first light modulator is a light modulator that is switchable between two fixed states. Binary light modulators have the advantage of being very fast, whereas analog phase modulators, such as those typically used in holographic approaches, are much slower. The light modulator can be implemented, for example, as a liquid crystal modulator or as a micro-electromechanical modulator, especially as a micromirror array due to the achievable switching speed of such amplitude modulators. Such light modulators are commercially available, easy to realize and allow image rates from 30 kHz to 50 kHz. It is expected that even higher image rates will be achieved in the future. As an example, a light modulator with 1920×1080 or 2560×1600 switchable pixels can be used.

According to one aspect, for successive position determinations with a light distribution, an intensity profile of the light distribution is changed by changing a structural property of the associated one-dimensional or two-dimensional structure. For example, an edge steepness of the regions with an intensity increase adjacent to the local intensity minimum can be changed by changing a grating constant and/or an aspect ratio of the one-dimensional structure or a hole diameter of the two-dimensional structure. By changing the light distribution for successive position determinations or measurements, the accuracy of the position determination can be successively increased. In this way, the position of a molecule or fluorophore can be determined with increasing accuracy in iterative steps with several zoom levels. Especially when using a binary light modulator, such an iterative position determination can be performed very quickly.

If several emitters are localized strictly at the same time, then the changes of all single patterns can be done simultaneously. A concrete useful implementation for 1D gratings and the use of +1st and −1st order is described in the following. First, the grating constant of a (local) grating is chosen such that a grating is formed in the sample with a grating period that is noticeably larger (e.g., 600 nm) than a pre-localization accuracy (e.g., 200 nm). In the following iteration, the grating constant is chosen according to the resolution typically achieved in the previous iteration. Finally, the overall structure may have approximately the same extent in all iterations. The number of fringes may then be increased from iteration to iteration for improving the modulation of the grating formed in the sample.

According to one aspect, the light distributions result from a temporal superposition of different partial light distributions. For this purpose, for example, different diffraction orders generated by the first light modulator can be made to interfere in successive steps, resulting in each case in a partial light distribution which in a sense has an inclined axis. For example, a first partial light distribution may result from interference of the 0th order and the +1st order, whereas a second partial light distribution may result from interference of the 0th order and the −1st order. The direction of the inclination depends on which diffraction orders interfere. If the resulting partial light distributions are superimposed in time, the result is a three-dimensional accumulated light distribution that has a minimum in the axial direction at the position of the intersection of the inclined axes, adjacent to which are regions with an intensity increase. By a relative shift between the two partial light distributions in a lateral direction, i.e., by shifting the associated structures on the first light modulator perpendicularly to the optical axis and in the direction of the periodicity, the intersection point and thus the position of the minimum can be shifted in axial direction. This allows an extraordinarily fast position determination of a molecule or fluorophore in three dimensions.

According to one aspect, at least one light distribution is used to detect a marker in the sample for determining a drift. Alternatively, a drift can be determined from changes in the same direction in the measured positions of molecules in successive measurements. These approaches are particularly advantageous when not only positions of molecules but also movements of molecules are to be determined from successive measurements. If a movement of a fixed positioned marker is detected, the measured movements of molecules can be corrected with it. For this purpose, however, it is necessary to provide a suitable marker in the sample. In MINFLUX microscopy, such a marker can be, for example, a fluorophore, since due to the MINFLUX principle this hardly bleaches out. To provide a marker, a bottle beam can be used to bleach out a bead from a dyed structure, e.g., fibers in a fixed cell dyed with a non-switchable fluorophore. If a particular spot is illuminated for a while, the fiber around a spot will be bleached out. In this way, a permanently luminous spot can be created that is in principle arbitrarily small. This spot can have a size of 40 nm to 100 nm, for example, and can then be localized gently using the MINFLUX principle. Alternatively, however, it can also be deduced from the motion of a large number of molecules in the same direction that a relative displacement has occurred between the sample and the measurement setup. The measured movements of the individual molecules can then be corrected for the portion of the movement in the same direction.

According to one aspect, the light distributions in the sample have lateral dimensions in the range of 0.5 µm to 4 µm. It has shown that with these dimensions of the light distributions in the sample reliable position determinations can be achieved and at the same time a large number of independently positionable light distributions can be realized.

In the solution based on locally modified light distributions, the patterns are larger. It may happen that a fluorophore starts to emit in the area of an existing pattern, but at some distance from the fluorophores to be localized with the pattern. In this case, the pattern is blanked for the corresponding area when the newly appearing fluorophore falls on a maximum of the pattern. The newly appearing fluorophore is not necessarily determined from a single measurement. It may likewise be determined from several subsequent measurements. The signal measured for the newly appearing fluorophore may be used for pre-localization of this fluorophore.

In one embodiment, the estimation of the positions of the active luminophores or fluorophores, which precedes the application of the localization according to the MINFLUX principle, can be performed by generating a sequence of one-dimensional grating-shaped illumination light distributions, preferably by means of the first light modulator. Subsequently, the more precise localization is carried out simultaneously for a majority of the plurality of fluorophores or for all fluorophores, in each case according to the MINFLUX principle.

It is advantageous to pre-localize the fluorophores already on the basis of illumination with a one-dimensional distribution of illumination light, e.g. by means of a purely camera-based localization. In this way, fluorophores that coincide with maxima of the light distribution are found with higher probability. The local MINFLUX light distributions may then be adapted to these fluorophores by ensuring that the pre-localized fluorophores are placed near a minimum or that the continuous pattern in the area of an identified fluorophore caused by the associated structures on the first light modulator is only switched on when the fluorophore falls in or into the vicinity of an intensity minimum. Then, if fluorophores emit fluorescence elsewhere, they can be pre-localized while the process is running and subsequently located along with the fluorophores found earlier using MINFLUX. Conversely, where fluorophores cease to emit fluorescence after localization, the pattern can always remain on, regardless of the relative position of the previously localized fluorophore.

If there are too many fluorophores on in an area, i.e., if there are areas with non-singulated fluorophores, depending on the objective to be achieved, either the light in this area can be turned off and another measurement can be made at a later time, or fluorescence images can be taken in the area with either diffraction-limited wide-field resolution or by taking SIM images. If the latter is intended, it is advantageous to use patterns in three orientations, also for MINFLUX.

In one embodiment, fluorophores, e.g. the above-mentioned caged dyes, can first be selectively brought into a fluorescent state only in certain areas or selectively left in a fluorescent state in partial areas with a light distribution of a suitable wavelength using suitable projected patterns. For this purpose, other basic patterns can be used in addition to the microgratings and donuts described above. In particular, the light distribution can be a point grating as a whole or in sections. In addition, continuous two-dimensional illumination patterns with continuously varying accumulated light intensity are possible, e.g., by using a DMD in grayscale mode, which are adapted to the density distribution of the structure to be observed, so that a desired density distribution of activated molecules can be specifically generated. In this context, when using appropriate fluorophores, for example, the same light modulator can preferably be used in an image plane for the activation as for the following excitation.

Also a sequence or combination of different light distributions can be used, for example a sequence of a pattern of activation light with an intensity distribution adapted in such a way that inactive fluorophores in areas of the intensity maxima are switched to an active state with a suitable probability, and a corresponding pattern of deactivation light, which has zero points in areas of the intensity maxima of the activation light and thus leaves fluorophores in an active state there. The adjustment of activation light in such a way that only a suitable, small amount of the fluorophores is activated is known in principle to the skilled person. The MINFLUX principle can then be used in parallel in the areas prepared in this way.

Thus, care is taken to know quite precisely from the outset where fluorophores may be in fluorescent state at all, or in which areas the density of fluorescent fluorophores is suitable for single fluorophore detection, and then the fact is exploited that the subgratings can be shifted independently.

If patterns of the same period are used for activation of molecules or setting the distribution of active molecules as for subsequent localization, the sample is very well prepared for the application of the solution based on locally modified light distributions.

When activation is performed with 1D patterns, the above statement applies to localization in the associated direction, but not to localization perpendicular to it. It is thus advantageous to use a 2D activation pattern in case of 2D localization.

For each of the fluorophores to be localized, a combination of an excitation light distribution and a deactivation light distribution can also be advantageously used, in which the deactivation light is STED light. In this case, at least one local central minimum of the STED light distribution and the minimum of the excitation light distribution, which is used for the localization, i.e. within which the fluorophore to be localized is located according to the preceding location estimation, advantageously coincide in each case. Here, the light distributions do not have to correspond completely. For example, a donut can be selected as the STED light distribution and a one-dimensional grating as the excitation light distribution. For the localization of the fluorophores, the excitation light distributions and the STED light distributions can then be repositioned simultaneously, i.e. shifted and, if necessary, reoriented, or excitation light distributions can be repositioned while the STED light distributions are left stationary, so that excitation minima are positioned several times differently in each case within a range of an STED minimum, or the excitation light distributions can be left stationary and the STED light distributions repositioned. Combinations of the three variants mentioned are also conceivable. Alternatively or in addition to the repositioning, the dimensions and/or intensities of the light distributions of the excitation light and/or the STED light can also be changed. For example, at the beginning STED donuts with spatially more extended minimum can be superimposed with excitation light distributions and in following steps these STED donuts can be narrowed and/or their intensity can be increased, e.g., depending on the localization accuracy already achieved. In all cases mentioned here, for the generation of the light distributions of the two light types, one light modulator is preferably used for each light type, each of which is arranged in an image plane within an associated excitation or STED light path. The light paths, viewed in the direction of the light paths, can be combined, for example, by means of a beam combiner, which may be a dichroic component.

In a further variant in which a combination of an excitation light distribution and a deactivation light distribution is used, in which the deactivation light is STED light, the STED light distributions have local minima, but not the excitation light distributions. In this variant, the MINFLUX principle is not implemented, but the positions of the molecules to be localized are still determined based on the photons detected for the different positionings of the light distributions, preferably using a ratiometric method. For example, luminophores or fluorophores that can be placed in a protected state can be used. Such luminophores and their use in a particular STED method are known, for example, from WO 2014 108455 A1. In one embodiment of the invention, corresponding luminophores, a portion of which is in an excitable state in the initial state of the sample, are switched from at least the excitable state to a protective state using light distributions of switching light, each of which has a local minimum, in the region outside the minimum. Subsequently, the sample is exposed to corresponding light distributions, each composed of an excitation light distribution and a STED light distribution, wherein the STED light distributions each have a minimum which locally overlaps with a minimum of a corresponding switching light distribution. Switching light and STED light can be identical with respect to their wavelength. In this way, it is highly probable that only a single luminophore is excitable within the STED minimum, which can then be localized using a ratiometric method. Outside the minimum, at least a plurality of the luminophores are in a protected state in which they are not bleached by either the excitation or the STED light. The use of the STED light prevents that during the localization of a single group of fluorophores, a fluorophore adjacent to a fluorophore of the group randomly changes to an excitable state and interferes with or prevents the localization of the fluorophore in question.

In a corresponding manner, fluorophores that are in a protected state in the initial state can also be used. These can then be activated locally using activation light distributions, which preferably have a diffraction-limited central maximum, and subsequently localized using a combination of excitation and STED light, as described. Alternatively, their localization can also be performed exclusively using excitation light distributions.

According to one aspect, the photons emitted by the molecules are detected using a camera or an array of photon counters. The use of a camera has the advantage that a camera is inexpensive and allows for fast readout. Using photon counters has the advantage that they are very efficient at detecting photons and also have very high time resolution. The photon counters can be, for example, SPADs (SPAD: Single Photon Avalanche Diode).

According to another aspect, a microscope comprises:
a light source for generating coherent light;
a first light modulator having a plurality of switchable pixels disposed in an image plane of the microscope for generating a plurality of light distributions arising due to interference of coherent light, each light distribution having a local intensity minimum and regions with an intensity increase adjacent thereto;
optical means for illuminating two or more spaced-apart molecules in a sample with one light distribution each;
a detector unit for detecting photons emitted by the molecules for each of the light distributions for different positionings of the light distributions, the light distributions being positionable independently of each other; and
an apparatus according to the present principles for determining positions of the two or more molecules in one or more spatial directions.

According to another aspect, a microscope comprises:
a light source for generating coherent light;
a first light modulator having a plurality of switchable pixels, which is disposed in an image plane of the microscope for generating a sequence of light distributions arising due to interference of coherent light, each light distribution having local intensity minima and regions with an intensity increase adjacent thereto, wherein subsequent light distributions are locally modified in accordance with estimated positions of the molecules;
optical means for illuminating two or more spaced-apart molecules in a sample with the light distributions;
a detector unit for detecting photons emitted by the molecules for the different light distributions; and
an apparatus according to the present principles for determining positions of the two or more molecules in one or more spatial directions.

BRIEF DESCRIPTION OF THE DRAWINGS

Further features will be apparent from the following description and the appended claims in conjunction with the figures.

DETAILED DESCRIPTION OF PREFERRED EMBODIMENTS

For a better understanding of the principles of the present disclosure, embodiments will be explained in more detail below with reference to the figures. It is understood that the disclosure is not limited to these embodiments and that the features described may also be combined or modified without departing from the scope of protection of the disclosure as defined in the appended claims.

Figure 1:
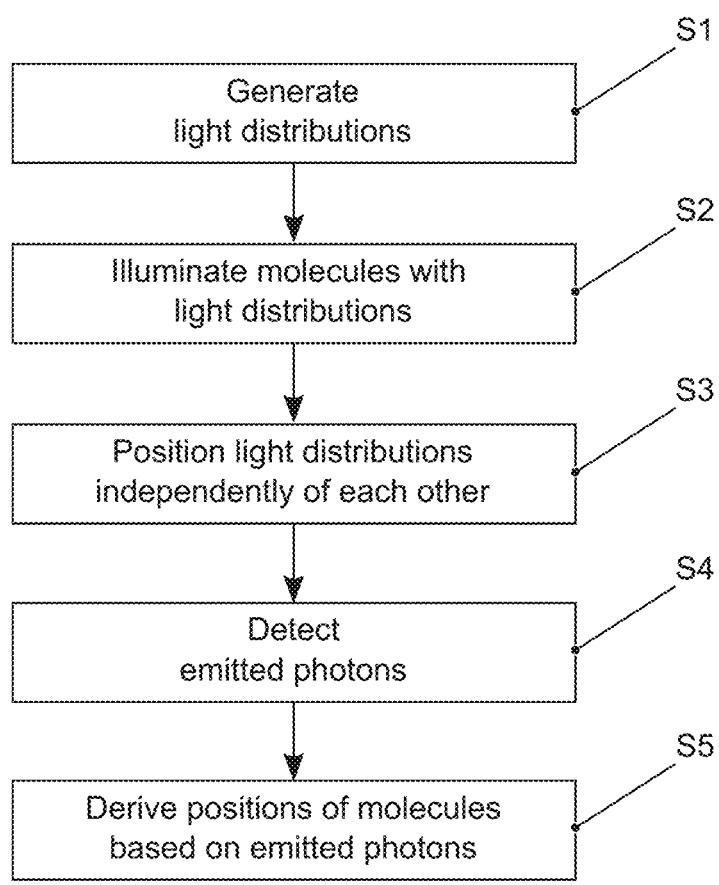
FIG. 1 schematically shows a method for determining positions of two or more spaced-apart molecules in one or more spatial directions in a sample.

FIG. 1 schematically shows a method for determining positions of two or more spaced molecules in one or more spatial directions in a sample. For the determination of the positions of the molecules, light distributions are used which arise due to interference of coherent light. In the method, a plurality of light distributions are generated S1 using a first light modulator having a plurality of switchable pixels. The first light modulator, preferably an amplitude modulator, is arranged in an image plane of a localization microscope and is preferably switchable between two fixed states. Preferably, a second light modulator is arranged to influence the light distributions in a Fourier plane, e.g., to block individual diffraction orders. Each light distribution has at least one local intensity minimum and regions with an intensity increase adjacent thereto. Each of the two or more molecules is illuminated S2 with one light distribution. For each of the light distributions, photons emitted by the molecules are detected S4 for different positionings of the light distribution S. The light distributions are positioned S3 independently of each other. Based on the photons detected for the different positionings of the light distributions, the positions of the molecules are finally derived S5. For generating S1 the light distributions, one-dimensional structures, e.g. grating structures, or two-dimensional structures, e.g. ring structures, can be formed by means of the switchable pixels of the first light modulator. For positioning S3 the light distributions, the formed structures are then shifted. The displacements of the structures are preferably smaller than dimensions of structural elements of the structures, whereby the dimensions of the structural elements in both dimensions are larger than a size of the pixels. Structural elements are the grating lines in the case of a grating structure, and the ring in the case of a ring structure. The light distributions can also result from a temporal superposition of different interference patterns of coherent light beams. For this purpose, for example, different diffraction orders generated by the first light modulator can be brought to interference in successive steps and the resulting interference patterns can be shifted relative to each other in a lateral direction. Furthermore, it is possible that for successive positionings of a light distribution, an intensity characteristic of the light distribution is changed by changing a structural property of the associated one-dimensional or two-dimensional structure. For example, an edge steepness of the regions with an intensity increase adjacent to the local intensity minimum can be changed by changing a grating constant of the one-dimensional structure or a hole diameter of the two-dimensional structure. The availability of a plurality of light distributions can be used to detect and compensate for sample drift. For example, at least one light distribution can be used to detect a marker in the sample. Alternatively, a drift can be determined from changes in the same direction in the measured positions of the molecules in successive measurements.

Figure 2:
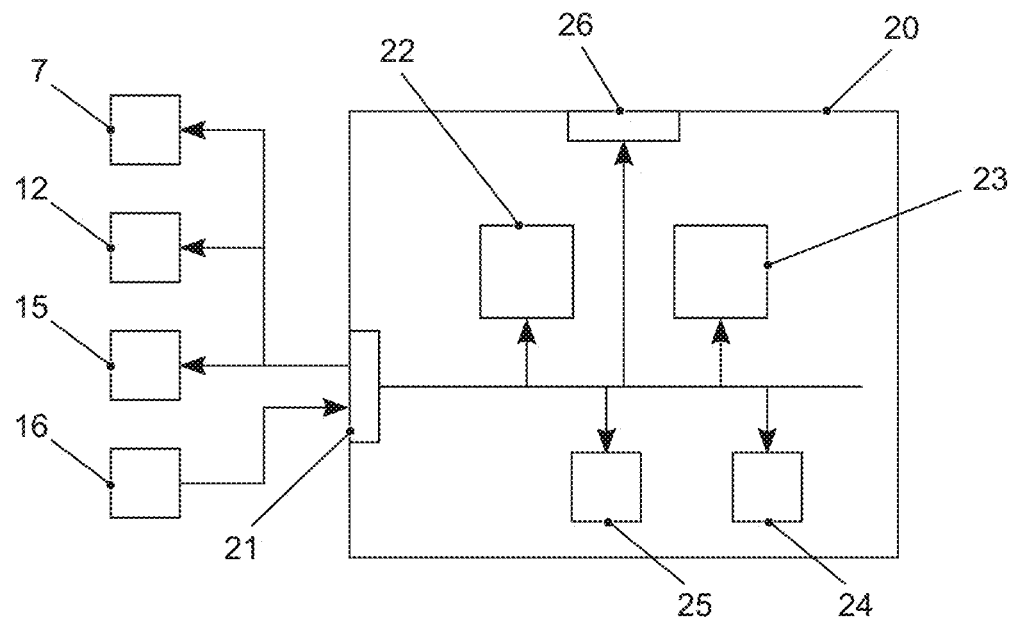
FIG. 2 shows a first embodiment of an apparatus for determining positions of two or more spaced-apart molecules in one or more spatial directions in a sample.

FIG. 2 shows a simplified schematic representation of a first embodiment of an apparatus 20 for determining positions of two or more spaced-apart molecules in one or more spatial directions in a sample. The apparatus 20 has an interface 21 via which an operating unit 22 controls a first light modulator 7 having a plurality of switchable pixels to generate a plurality of independently positionable light distributions. The first light modulator 7, preferably an amplitude modulator, is arranged in an image plane of a localization microscope and is preferably switchable between two fixed states. Each light distribution has at least one local intensity minimum and regions with an intensity increase adjacent thereto. Via the interface 21, the operating unit 22 can also control a second light modulator 12 arranged in a Fourier plane for influencing the light distributions, e.g. for blocking individual diffraction orders, and a light source 15. The second light modulator 12 may likewise be a filter that blocks one or more fixed diffraction orders. An evaluation unit 23 receives data from a detector unit 16 via the interface 21, with which photons emitted by the molecules are detected. Based on the photons emitted by the molecules for each of the light distributions for different positioning of the respective light distributions, the evaluation unit 23 derives the positions of the molecules. For generating the light distributions, one-dimensional structures, e.g., grating structures, or two-dimensional structures, e.g., ring structures, can be formed by means of the switchable pixels of the first light modulator. For positioning the light distributions, the formed structures are then shifted. The displacements of the structures are preferably smaller than dimensions of structural elements of the structures, whereby the dimensions of the structural elements in both dimensions are larger than a size of the pixels. Structural elements are the grating lines in the case of a grating structure, and the ring in the case of a ring structure. The light distributions can also result from a temporal superposition of different interference patterns of coherent light beams. For this purpose, for example, different diffraction orders generated by the first light modulator can be brought to interference in successive steps and the resulting interference patterns can be shifted relative to each other in a lateral direction. Furthermore, it is possible that for successive positionings of a light distribution, an intensity characteristic of the light distribution is changed by changing a structural property of the associated one-dimensional or two-dimensional structure. For example, an edge steepness of the regions with an intensity increase adjacent to the local intensity minimum can be changed by changing a grating constant of the one-dimensional structure or a hole diameter of the two-dimensional structure. The availability of a plurality of light distributions can be used to detect and compensate for sample drift. For example, at least one light distribution can be used to detect a marker in the sample. Alternatively, a drift can be determined from changes in the same direction in the measured positions of the molecules in successive measurements.

The operating unit 22 and the evaluation unit 23 can be controlled by a control unit 24. If necessary, settings of the operating unit 22, the evaluation unit 23, or the control unit 24 can be changed via a user interface 26. The data accumulating in the apparatus 20 can be stored in a memory 25 of the apparatus 20 if required, for example for later evaluation or for use by the components of the apparatus 20. The operating unit 22, the evaluation unit 23 and the control unit 24 can be implemented as dedicated hardware, for example as integrated circuits. Of course, they may also be partially or fully combined or implemented as software running on a suitable processor, for example a GPU or a CPU. The interface 21 may also be implemented in the form of separate inputs and outputs.

Figure 3:
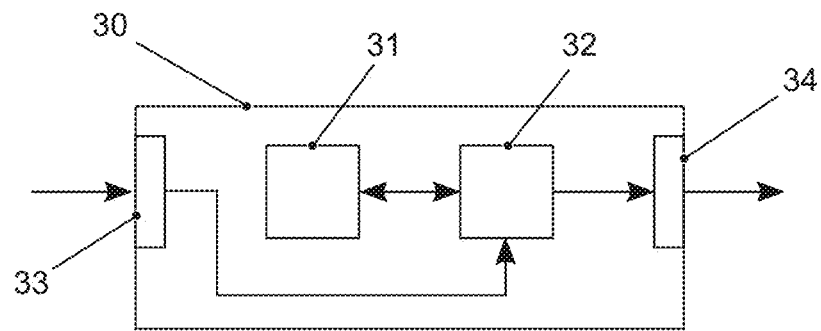
FIG. 3 shows a second embodiment of an apparatus for determining positions of two or more spaced-apart molecules in one or more spatial directions in a sample.

FIG. 3 shows a simplified schematic diagram of a second embodiment of an apparatus 30 for determining positions of two or more spaced-apart molecules in one or more spatial directions in a sample. The apparatus 30 includes a processor 32 and a memory 31. For example, the apparatus 30 is a microcontroller, a computer, or an embedded system. The memory 31 stores instructions that, when executed by the processor 32, cause the apparatus 30 to perform the steps according to one of the described methods. The instructions stored in the memory 31 thus embody a program executable by the processor 32 which implements the method according to the present principles. The apparatus 30 has an input 33 for receiving information. Data generated by the processor 32 is provided via an output 34. Furthermore, they can be stored in the memory 31. The input 33 and the output 34 may be combined to form a bidirectional interface.

The processor 32 may include one or more processing units, such as microprocessors, digital signal processors, or combinations thereof.

The memories 25, 31 of the described embodiments may include both volatile and non-volatile memory regions and may include a wide variety of storage devices and storage media, such as hard disks, optical storage media, or semiconductor memories.

Figure 4:
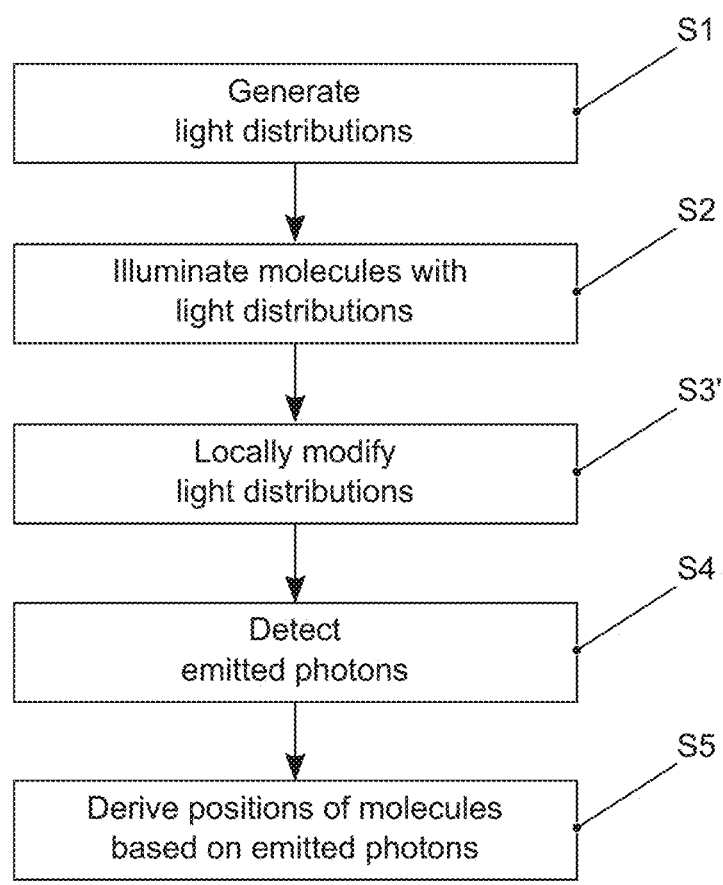
FIG. 4 schematically shows a further method for determining positions of two or more spaced-apart molecules in one or more spatial directions in a sample.

FIG. 4 schematically shows a further method for determining positions of two or more spaced molecules in one or more spatial directions in a sample. For the determination of the positions of the molecules, light distributions are used which arise due to interference of coherent light. In the method, a sequence of light distributions is generated S1 using a first light modulator having a plurality of switchable pixels. The first light modulator, preferably an amplitude modulator, is arranged in an image plane of a localization microscope and is preferably switchable between two fixed states. Preferably, a second light modulator is arranged to influence the light distributions in a Fourier plane, e.g., to block individual diffraction orders. Each light distribution has local intensity minima and regions with an intensity increase adjacent thereto. The two or more molecules are illuminated S2 with the light distributions. For each of the light distributions, photons emitted by the molecules are detected S4. Subsequent light distributions of the sequence of light distributions are locally modified S3' in accordance with estimated positions of the molecules. Based on the photons detected for the different light distributions, the positions of the molecules are finally derived S5. Preferably, for generating S1 the light distributions a grating structure is formed by means of the switchable pixels of the first light modulator. Subsequent light distributions are then locally modified S3' by switching off individual grating lines of the grating structure. In particular, those grating lines or groups of grating lines may be switched off that cause an intensity at an estimated position of a molecule that exceeds a threshold, e.g., because an intensity maximum is located at the estimated position or close to the estimated position. Advantageously, the grating structure formed by means of the switchable pixels of the first light modulator is shifted for subsequent light distributions.

Figure 5:
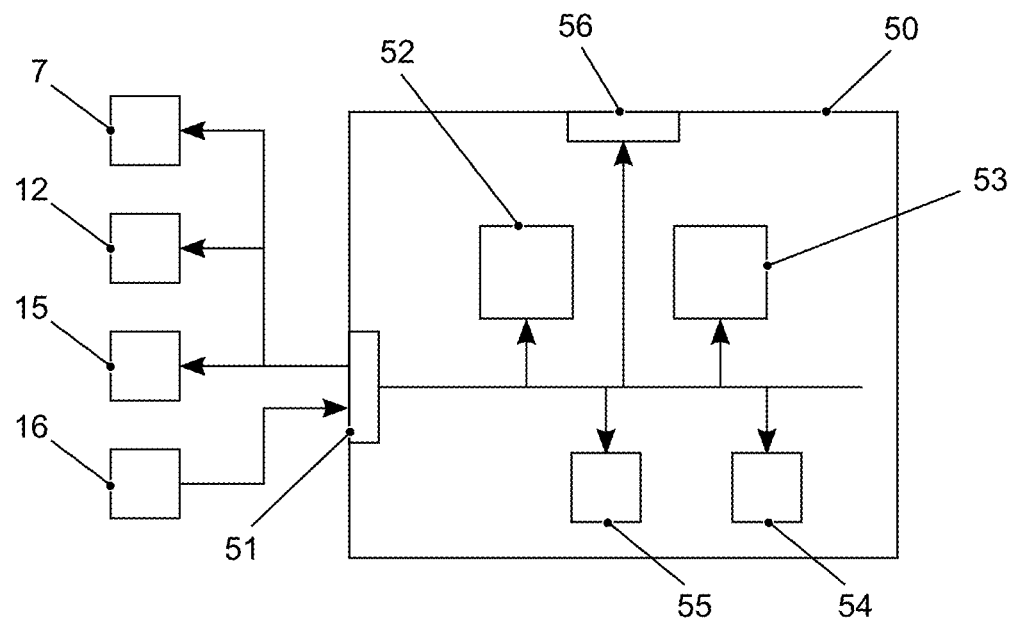
FIG. 5 shows a first embodiment of a further apparatus for determining positions of two or more spaced-apart molecules in one or more spatial directions in a sample.

FIG. 5 shows a simplified schematic representation of a first embodiment of a further apparatus 50 for determining positions of two or more spaced-apart molecules in one or more spatial directions in a sample. The apparatus 50 has an interface 51 via which an operating unit 52 controls a first light modulator 7 having a plurality of switchable pixels to generate a sequence of light distributions. The first light modulator 7, preferably an amplitude modulator, is arranged in an image plane of a localization microscope and is preferably switchable between two fixed states. Each light distribution has local intensity minima and regions with an intensity increase adjacent thereto. Via the interface 51, the operating unit 52 can also control a second light modulator 12 arranged in a Fourier plane for influencing the light distributions, e.g. for blocking individual diffraction orders, and a light source 15. The second light modulator 12 may likewise be a filter that blocks one or more fixed diffraction orders. An evaluation unit 53 receives data from a detector unit 16 via the interface 51, with which photons emitted by the molecules are detected. Based on the photons emitted by the molecules for each of the light distributions for different positioning of the respective light distributions, the evaluation unit 53 derives the positions of the molecules. Preferably, for generating the light distributions a grating structure is formed by means of the switchable pixels of the first light modulator. Subsequent light distributions are then locally modified by switching off individual grating lines of the grating structure. In particular, those grating lines or groups of grating lines may be switched off that cause an intensity at an estimated position of a molecule that exceeds a threshold, e.g., because an intensity maximum is located at the estimated position or very close to the estimated position. Advantageously, the grating structure formed by means of the switchable pixels of the first light modulator is shifted for subsequent light distributions.

The operating unit 52 and the evaluation unit 53 can be controlled by a control unit 54. If necessary, settings of the operating unit 52, the evaluation unit 53, or the control unit 54 can be changed via a user interface 56. The data accumulating in the apparatus 50 can be stored in a memory 55 of the apparatus 50 if required, for example for later evaluation or for use by the components of the apparatus 50. The operating unit 52, the evaluation unit 53 and the control unit 54 can be implemented as dedicated hardware, for example as integrated circuits. Of course, they may also be partially or fully combined or implemented as software running on a suitable processor, for example a GPU or a CPU. The interface 51 may also be implemented in the form of separate inputs and outputs.

Figure 6:
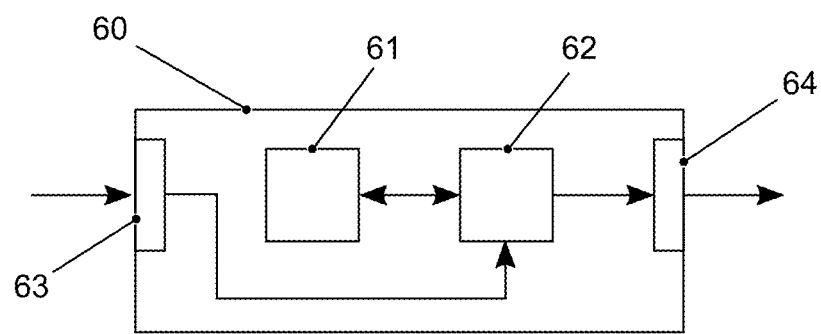
FIG. 6 shows a second embodiment of a further apparatus for determining positions of two or more spaced-apart molecules in one or more spatial directions in a sample.

FIG. 6 shows a simplified schematic diagram of a second embodiment of an apparatus 60 for determining positions of two or more spaced-apart molecules in one or more spatial directions in a sample. The apparatus 60 includes a processor 62 and a memory 61. For example, the apparatus 60 is a microcontroller, a computer, or an embedded system. The memory 61 stores instructions that, when executed by the processor 62, cause the apparatus 60 to perform the steps according to one of the described methods. The instructions stored in the memory 61 thus embody a program executable by the processor 62 which implements the method according to the present principles. The apparatus 60 has an input 63 for receiving information. Data generated by the processor 62 is provided via an output 64. Furthermore, they can be stored in the memory 61. The input 63 and the output 64 may be combined to form a bidirectional interface.

The processor 62 may include one or more processing units, such as microprocessors, digital signal processors, or combinations thereof.

The memories 55, 61 of the described embodiments may include both volatile and non-volatile memory regions and may include a wide variety of storage devices and storage media, such as hard disks, optical storage media, or semiconductor memories.

Figure 7:
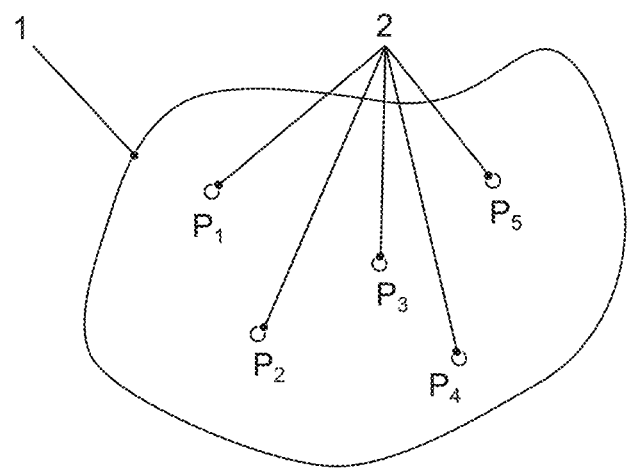
FIG. 7 shows a sample with a plurality of molecules.

FIG. 7 shows a sample 1 with a plurality of molecules 2. Five molecules 2 are shown as examples, whose positions $P_1$ to $P_5$ are to be determined. For this purpose, the molecules 2 are labeled with fluorophores, or the molecules 2 are directly the fluorophores. The fluorophores can be excited with light of a suitable wavelength to emit photons. In MINFLUX microscopy, the fluorophores are excited in such a way that a fluorophore to be localized is always placed close to or in a minimum of a light distribution used for excitation, whereby the light distribution must have a regions with an intensity increase range adjacent to the minimum. In this way, a better utilization of the fluorescence photons is achieved with respect to obtaining information about the position of the respective emitting fluorophore. Ideally, the minimum of the excitation light distribution is a zero point.

Figure 8:
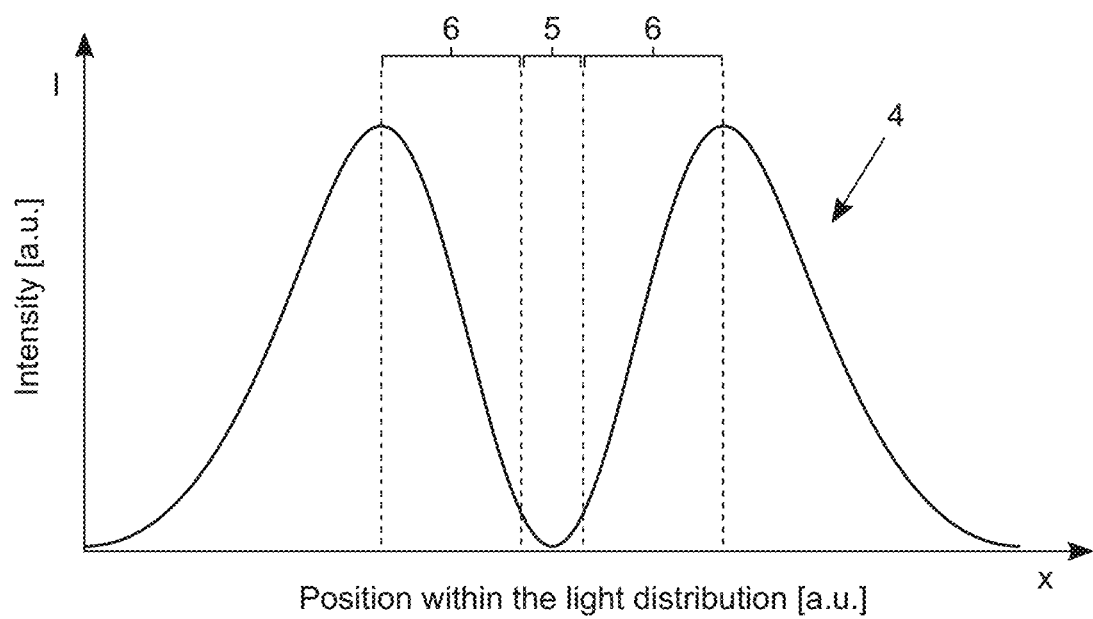
FIG. 8 shows an intensity curve over a cross-section through a light distribution.

FIG. 8 shows an exemplary intensity curve over a cross-section through a light distribution 4 suitable for the solution according to the present principles. The intensity I is plotted against the position within the light distribution 4, here along the x-axis. The intensity curve of the light distribution 4 has a central intensity minimum 5, which is adjoined on both sides by regions 6 with an intensity increase. Such a light distribution 4 can be realized, for example, in the form of an intensity distribution in the shape of a donut. In this case, the central intensity minimum 5 is surrounded on all sides by regions 6 with an intensity increase, so that position determination in two dimensions is readily possible. Alternatively, however, such a light distribution 4 can also be realized as an interference pattern of a stripe grating. In this case, the light distribution 4 has more than one intensity minimum 5, but only one of them is used. In addition, regions 6 with an intensity increase are adjacent to the intensity minimum 5 on only two opposite sides, so that at least one correspondingly rotated stripe grating is required for position determination in two dimensions. As will be explained below, position determination in three dimensions is also possible, provided that the intensity distribution varies appropriately along the beam propagation direction.

Figure 9:
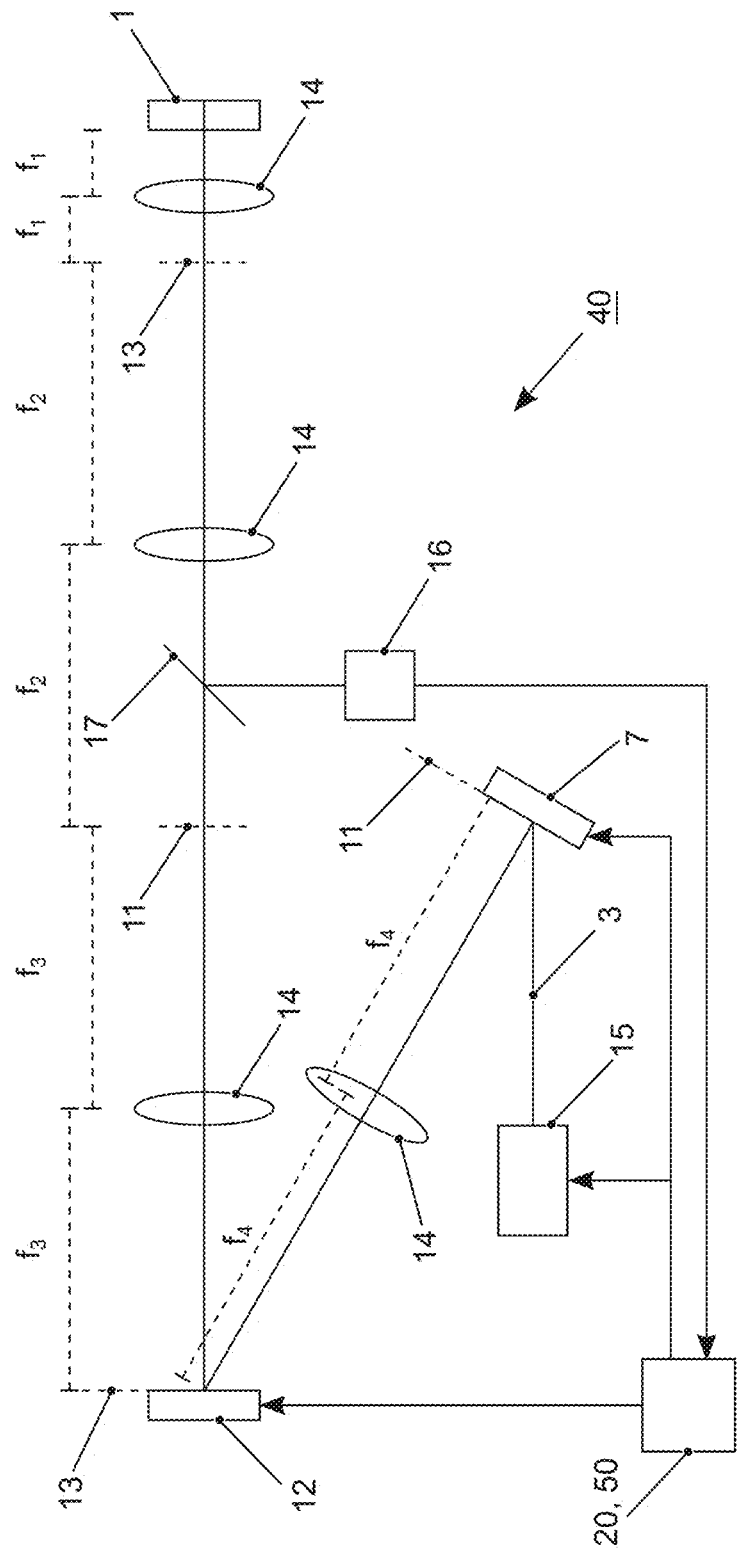
FIG. 9 shows a principle structure of a microscope in which a solution according to the present principles is implemented.

FIG. 9 shows an exemplary principle structure of a microscope 40 in which a solution according to the present principles is implemented. A light source 15, for example a laser, emits coherent light 3, for example with a wavelength of 640 nm. The coherent light 3 is incident on a first light modulator 7, which is arranged in an image plane 11 and has a plurality of switchable pixels, for example 1920×1080 or 2560×1600 pixels. By means of the first light modulator 7, a plurality of independently positionable light distributions or individually controllable light distributions can be generated by forming the switchable pixels into one-dimensional or two-dimensional structures. The light emitted by the first light modulator 7 is imaged by a lens 14 into a Fourier plane 13 in which a second light modulator 12 is located. The second light modulator 12 is used to influence the light distributions, for example by masking out individual diffraction orders. The light originating from the second light modulator 12 is imaged through further lenses 14 into the sample, where it can be used for position determination. For this purpose, photons emitted by the molecules in the sample 1 are directed via a beamsplitter 17, e.g. a wavelength-selective beamsplitter, in the direction of a detector unit 16 and detected by the latter. The detector unit 16 may be a camera, e.g., with 2048×2048 pixels. Taking into account the Nyquist criterion for scanning, only 640× 400 pixels are required for a field of view of 64 μm×40 μm, so that faster readout is possible and the use of multiple wavelengths can also be considered.

The first light modulator 7, the second light modulator 12 and the light source 15 are controlled by an apparatus 20, 50 according to the present principles for determining the positions of the molecules, which also evaluates the data from the detector unit 16. For simplicity, further components of the localization microscope 40, e.g. for influencing the polarization or a movement of the lenses 14 or the sample 1, are not shown in FIG. 9. These are known to the skilled person and can also be controlled by the apparatus 20, 50.

The ideal setup is the one shown in FIG. 9, in which the elements are located exactly in image planes 11 or in Fourier planes 13. However, a setup in which both are only approximately fulfilled is also possible. The tolerable deviation in axial direction scales with the Rayleigh lengths of the optics surrounding the elements, which in turn, viewed in beam direction, depends not only on the beam quality of the laser itself, but also on the focal length of the upstream optics or, viewed from the direction of the object plane, on the downstream optics in beam direction.

In practice, it is easiest to realize to place the second light modulator 12, which serves as a spatial filter, in a focal plane of the lens 14 after the first light modulator 7 and also to place the first light modulator 7 in an image plane to the object plane. Deviations from the ideal state at other points can be tolerated more easily in principle, but it is of course very easy to build up the structure from 7 via the first lens 14 to the spatial filter 12 in an ideal way.

Typically, STED microscopes are constructed from a microscope stand with a built-in objective and an associated tube lens. It is known where the (virtual) posterior focal plane is located. Often, in practice, this is referred to as the pupil plane or simply pupil. This plane is the plane to which the further optics must be referenced, i.e., if collimated illumination is to be provided in the object plane, then the incident beam must be focused into this plane, which then ends up being, or at least can be, within the geometric dimensions of the lens, i.e., it must be set up so that it would form a focus in the absence of the lens at this location. At the same time, this plane is the plane in which the field distribution should be present, whose Fourier transform should be present in the object. In practice, if the objective is removed, one can place a point source in this plane and image it through the tube lens. One then obtains, exactly where the point source is imaged, a plane conjugate to the Fourier plane, which is just another Fourier plane. It is then easy to determine further Fourier planes 13 or image planes 11.

The usable aperture of the above setup is related to the refractive index of the sample 1. If measurements are to be made deep inside the sample 1, the usable aperture is limited by the refractive index of the sample 1. The reason for this is that light from further out in the pupil cannot penetrate the sample due to total reflection.

If a higher aperture is to be used, the resulting pattern is limited to the area near the cover glass of the sample 1. The fluorescence is excited in the evanescent field, which penetrates a few nanometers into the sample 1. The penetration depth depends on the wavelength and is small compared with the wavelength.

Parallelized MINFLUX can also be realized in this case, especially for non-3D methods. One advantage is that the background is extremely small, since no light actually enters the sample 1.

For the 3D superposition of two inclined gratings for z-determination, as well as for 2D measurements in the sample 1, the gratings generating the patterns, or the positions of the foci of the diffraction orders in the pupil, must be chosen to be compatible with the refractive index of the sample 1. This means that the shortest period in the sample 1 depends on the refractive index of the sample 1.

For 3D measurements with bottle beams, the actual aperture used for illumination in the sample 1 is limited by the refractive index of the sample 1. If the minimum of the bottle beam is located at the cover glass, then the quality of the donut at this location is predominantly determined by the numerical aperture of the objective and the immersion medium, and is only to a small extent limited at this location by the sample 1.

Figure 10:
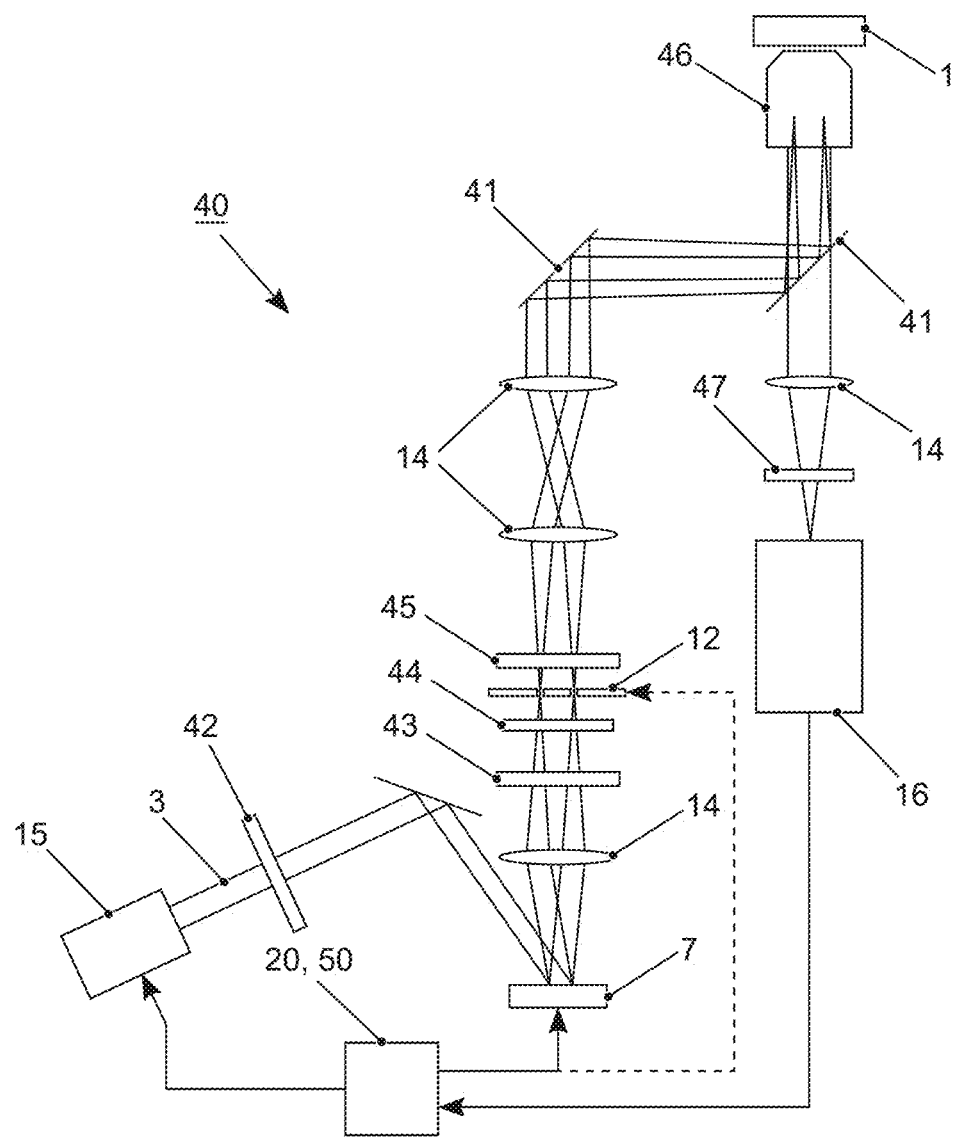
FIG. 10 shows a principle structure of a further microscope in which a solution according to the present principles is implemented.

FIG. 10 shows a principle structure of a further microscope 40 in which a solution according to the present principles is implemented. A light source 15, for example a laser, emits coherent light 3, for example with a wavelength of 473 nm. The coherent light 3 passes a polarization rotating element 42. The light beam then falls onto a first light modulator 7, in this case a DMD. By means of the first light modulator 7, a plurality of independently positionable or individually controllable light distributions can be generated by forming the switchable pixels into appropriate structures. The diffracted light originating from the first light modulator 7 is collected by a lens 14 and passes through a quarter wave plate 43, which generates circular polarization. The intensities of the individual diffracted beams may be controlled using a neutral density filter 44, which is arranged to attenuate the diffracted beams to different degrees. The neutral density filter 44 may likewise consist of several separate neutral density filters, which may be arranged in such way that they at least partially overlap. A second light modulator 12, in this case a fixed beam block, blocks unwanted diffraction orders and allows only the first orders to pass through. A segmented polarizer 45 or "Pizza"-polarizer then generates azimuthal polarization. In case the polarization rotating element 42 is a controllable element, the segmented polarizer 45 may also be omitted. The light originating from the beam block is relayed by two lenses 14 and reflected by two dichroic beam splitters 41, which are identical, but rotated to eliminate detrimental polarization effects. The two diffraction orders are projected close to the edge of the back focal plane of an objective 46. The diffraction orders interfere at the focal plane and generate the desired grating-like illumination pattern in the sample 1. The emitted fluorescence is collected by the objective 46, passes through the dichroic mirror 41, a further lens 14 and one or more emission filters 47. The one or more emission filters 47 filter unwanted excitation light. A detector unit 16, e.g., a camera, then detects the fluorescence signals.

The first light modulator 7, the light source 15, and optionally the second light modulator 12 are controlled by an apparatus 20, 50 according to the present principles for determining the positions of the molecules, which also evaluates the data from the detector unit 16. For simplicity, further components of the localization microscope 40, e.g. for a movement of the lenses 14 or the sample 1, are not shown in FIG. 10. These are known to the skilled person and can also be controlled by the apparatus 20, 50.

As is apparent, the structure corresponds largely to the one shown in FIG. 9, but can further be used for SIM microscopy. In particular, the microscope comprises a first light modulator 7 in an image plane and a second light modulator 12 in a Fourier plane for selecting desired diffraction orders. In this case, however, the second light modulator 12 is a fixed beam block. Of course, it may likewise be a controllable light modulator, which is indicated by the dashed line originating from the apparatus 20, 50. The second light modulator 12 is imaged into the back focal plane of an objective 46 and a grating structure is formed in the sample 1 through interference of two diffraction orders.

In addition, the microscope 40 comprises means for controlling the polarization. The segmented polarizer 45 ensures that only light with a suitable linear polarization is relayed. The linear polarization is oriented parallel to the grating lines of the grating structure generated in the sample 1, perpendicularly to the periodicity of the grating structure. This optimizes the modulation of the pattern. As the microscope shall be suitable for SIM microscopy, the second light modulator 12, i.e., the fixed beam block, should have the same symmetry as the segmented polarizer 45. SIM microscopy typically uses three orientations, which means that the segmented polarizer 45 and the second light modulator 12 are suitable for generating grating structures oriented at 0°, 60°, and 120°.

Figure 11:
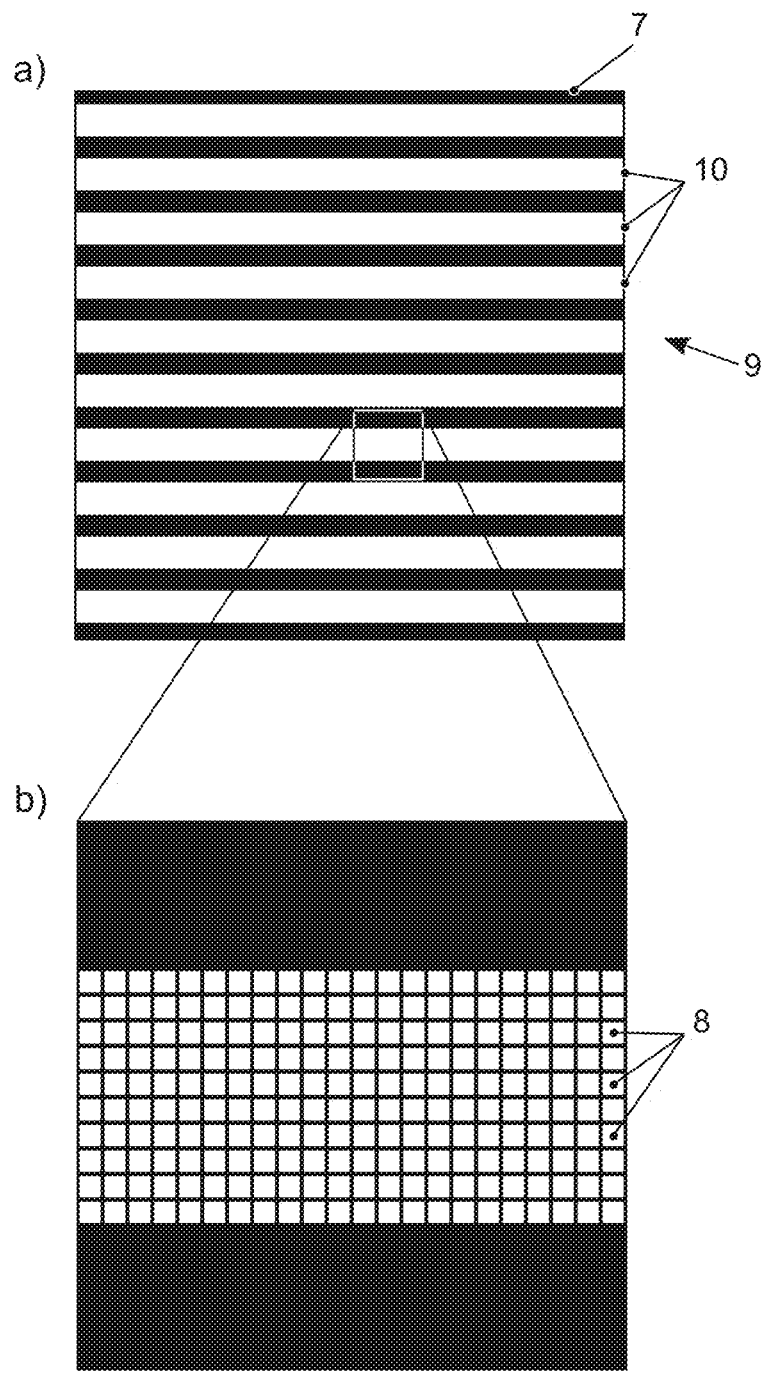
FIG. 11 illustrates the realization of a structure by means of a light modulator with a plurality of pixels.

FIG. 11 illustrates the realization of a structure 9 by means of a light modulator 7 with a plurality of pixels 8. FIG. 11a) shows a structure 9 with a plurality of structural elements 10, in this case a stripe grating. The structural elements 10 are therefore the individual grating lines. FIG. 11b) shows an enlarged section of a single grating line. The grating line is composed of a plurality of pixels 8 of the light modulator 7, i.e., the dimensions of the structural elements 10 are larger in both dimensions than the size of the pixels 8. For positioning the light distributions, the structures 9 realized by the light modulator 7 are shifted, i.e., the individual structural elements 10 are shifted here by integer multiples of the pixel size. The minimum displacement of a structure in this binary light modulator 7 is given by the pixel size and thus smaller than the dimension of the structural elements 10. Sub-pixel displacements can be achieved, for example, by oblique patterns (aliasing effects), perforated patterns or multi-level or analog modulators, possibly in combination with additional Fourier filtering.

Figure 12:
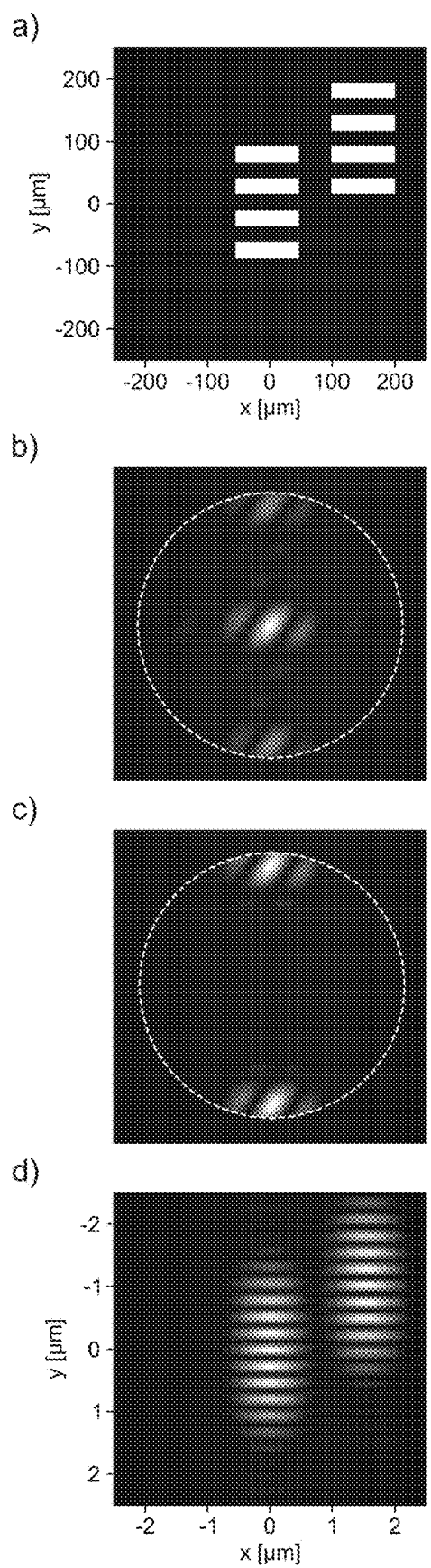
FIG. 12 shows a first example of the generation of several independently positionable light distributions.

FIG. 12 shows a first example of the generation of several independently positionable light distributions. FIG. 12a) shows the structures realized with the first light modulator, in this case two strip gratings with four grating lines each. FIG. 12b) shows the corresponding diffraction orders in the Fourier plane. There, in this example, the 0th order is blocked by the second light modulator, which is shown in FIG. 12c). In the further course, the +1st order and the −1st order interfere, which in the plane of the sample, i.e. that of the xy-plane, leads to the interference patterns shown in FIG. 12d). For the position determination, in each case in particular the ±1st intensity minimum with the adjacent intensity maxima can be used, i.e. the 0th and the ±1st intensity maximum, which have approximately the same maximum intensity.

Figure 13:
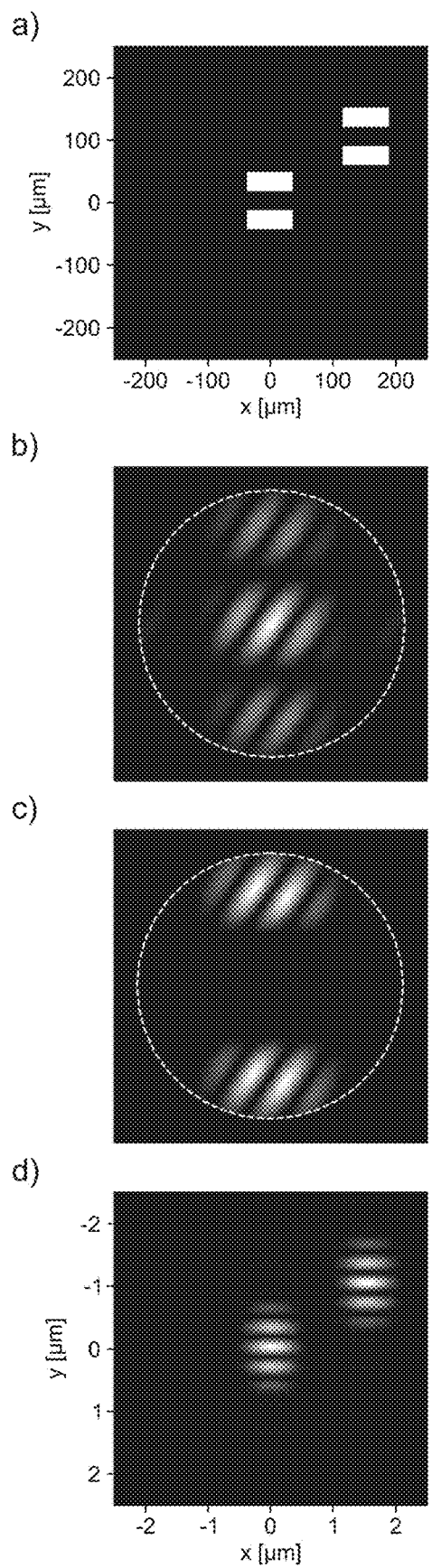
FIG. 13 shows a second example of the generation of several independently positionable light distributions.

FIG. 13 shows a second example of the generation of several independently positionable light distributions. Here, FIG. 13a) shows the structures realized with the first light modulator, in this case two strip gratings with only two grating lines each. The lateral dimensions of the strip gratings are smaller than in the example shown in FIG. 12. FIG. 13b) again shows the corresponding diffraction orders in the Fourier plane. There, as before, the 0th order is blocked by the second light modulator, which is shown in FIG. 13c). In the further course, the +1st order and the −1st order interfere, which in the plane of the sample leads to the interference patterns shown in FIG. 13d). Again, in particular the ±1st intensity minimum with the adjacent 0th and ±1st intensity maxima can be used for position determination. Although these intensity maxima have different maximum intensities, the deviations do not yet lead to an impairment of the position determination.

Figure 14:
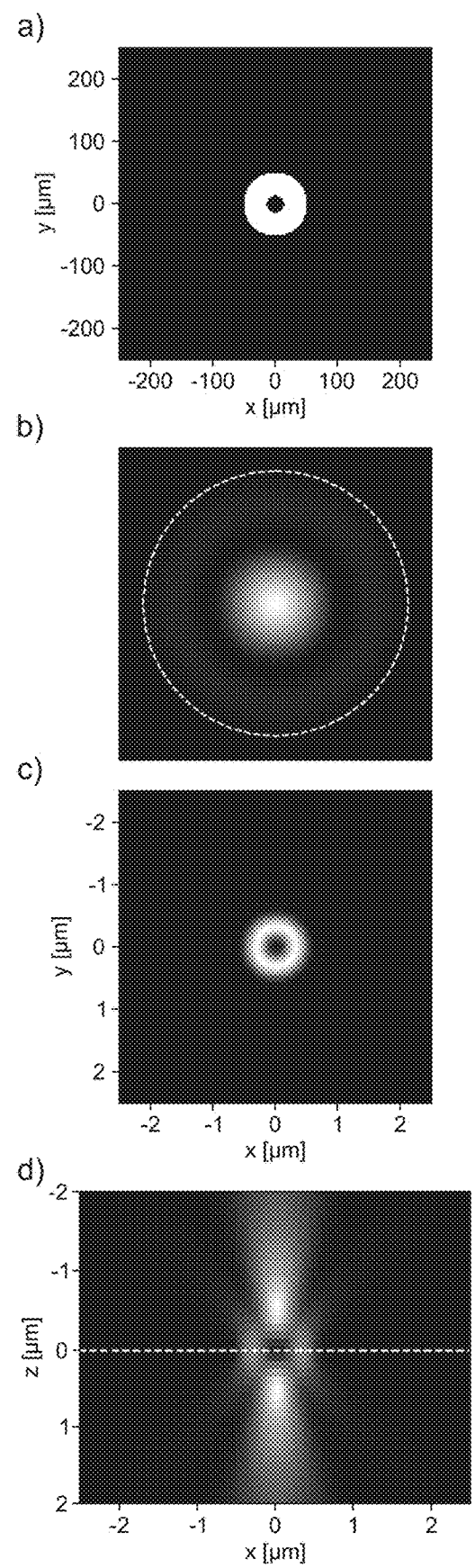
FIG. 14 shows an example of the generation of a light distribution in the form of a bottle beam, which has a zero point limited in three spatial directions.

FIG. 14 shows an example of the generation of a light distribution in the form of a bottle beam. FIG. 14a) shows the structure realized with the first light modulator, in this case a ring structure. FIG. 14b) shows the corresponding situation in the Fourier plane. In the plane of the sample, the result is the image shown in FIG. 14c). The central intensity minimum is surrounded on all sides by an intensity maximum. In the axial direction, i.e. in the beam propagation direction, the intensity profile shown in FIG. 14d) as a section in the xz-plane is obtained. As can be clearly seen, the light distribution also has an intensity minimum in the axial direction, to which regions with intensity increase are adjacent. The light distribution thus allows position determination in three dimensions. For this purpose, the sample can be moved in the axial direction, for example. Alternatively, an additional dynamically focusing element can be arranged in the beam path, with which the light distributions can be shifted in the axial direction, e.g. a deformable mirror.

Figure 15:
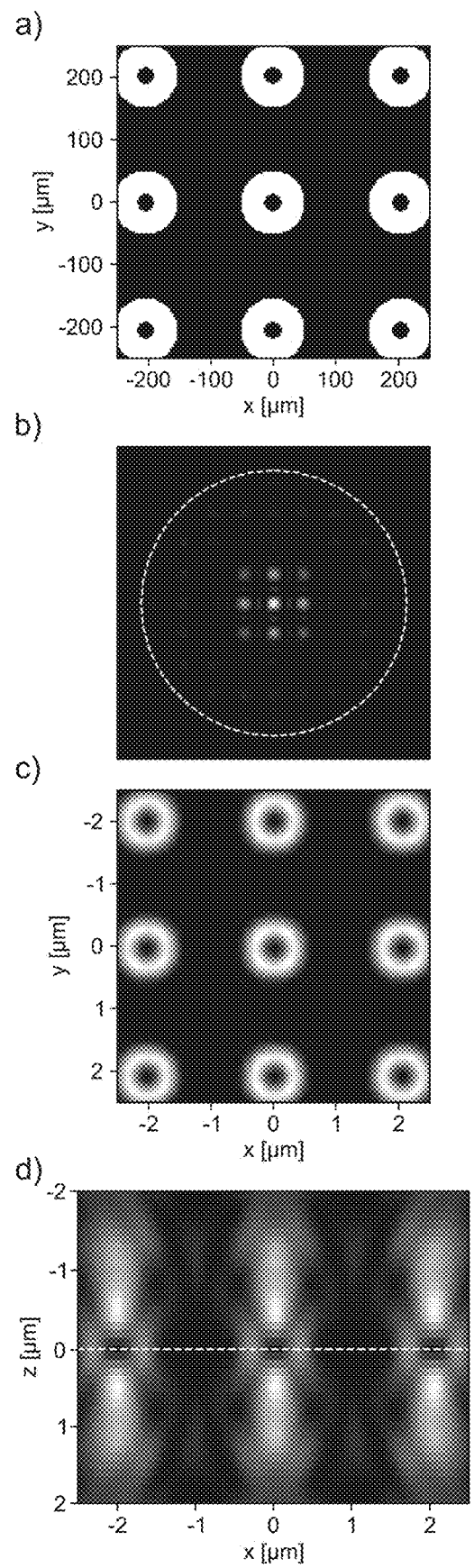
FIG. 15 shows an example of the generation of several independently positionable light distributions in the form of bottle beams.

FIG. 15 shows an example of the generation of several independently positionable light distributions in the form of bottle beams. FIG. 15a) shows the structure realized with the first light modulator, in this case nine independently positionable ring structures. FIG. 15b) shows the corresponding situation in the Fourier plane. In the plane of the sample, the result is the image shown in FIG. 15c). In all nine light distributions, the central intensity minimum is surrounded on all sides by an intensity maximum. In the axial direction, the intensity profile shown in FIG. 15d) as a section in the xz-plane is obtained. As can be clearly seen, all light distributions also have an intensity minimum in the axial direction, to which regions with an intensity increase are adjacent, so that a position determination in three dimensions is possible.

Figure 16:
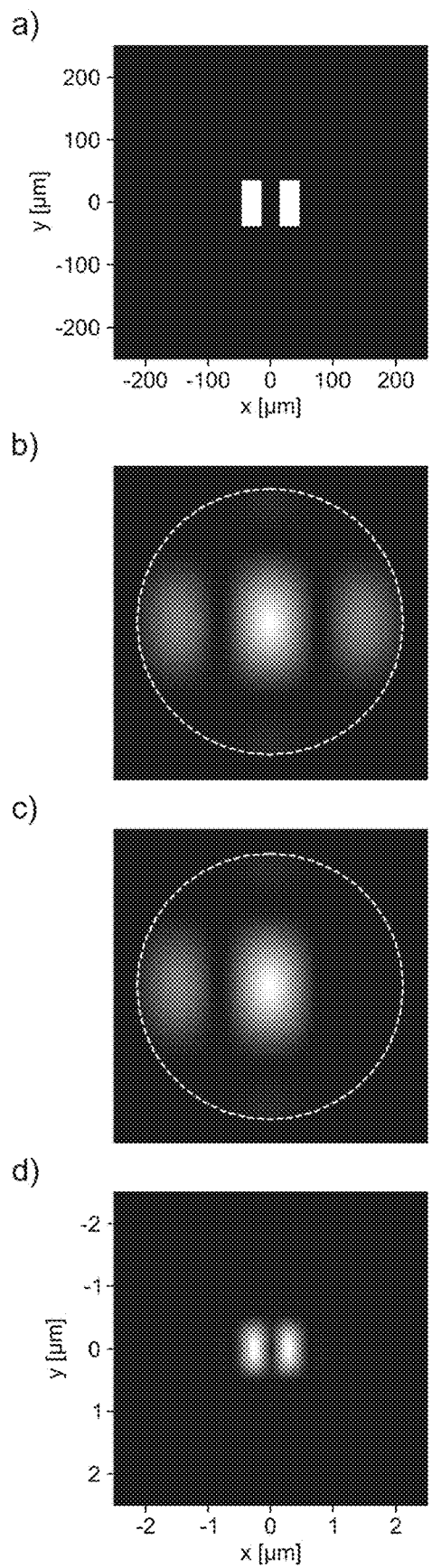
FIG. 16 shows an example of the generation of a light distribution by a temporal superposition of different partial light distributions.
Figure 17:
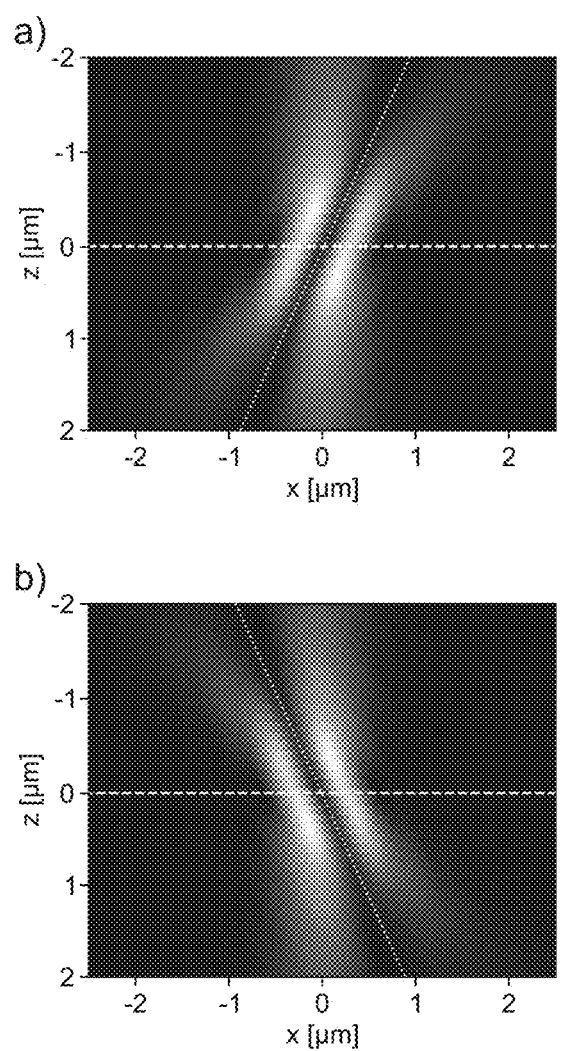
FIG. 17 shows axial sections through the diffraction orders used for superposition.
Figure 18:
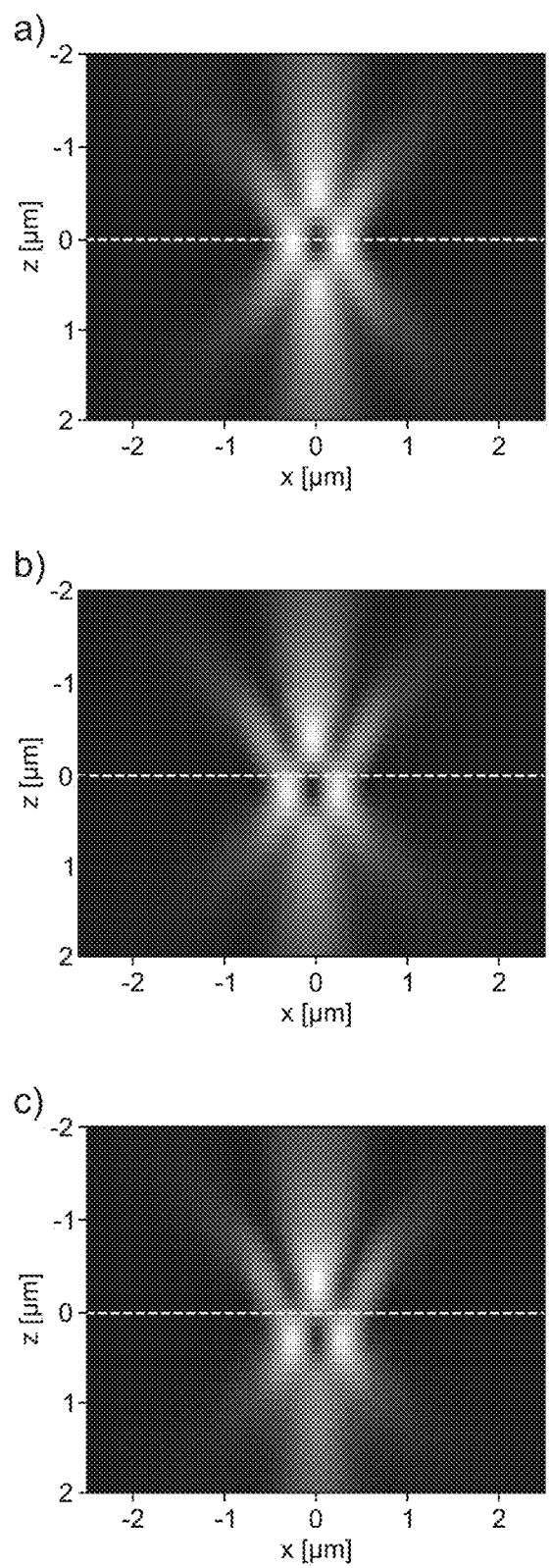
FIG. 18 shows axial sections through the light distribution generated according to FIG. 16 for different relative lateral shifts of the partial light distributions.

FIG. 16 shows an example of the generation of a light distribution by a temporal superposition of different partial light distributions. FIG. 16a) shows the structure realized with the first light modulator, in this case a striped grating with two grating lines. FIG. 16b) shows the corresponding diffraction orders in the Fourier plane. There, in this example, the +1st order is blocked by the second light modulator, which is shown in FIG. 16c). Further on, the 0th order and the −1st order interfere, resulting in the partial light distribution shown in FIG. 16d) in the plane of the sample, i.e. that of the xy-plane. As can be clearly seen, this results in a light distribution with an intensity minimum and intensity maxima adjacent to it on both sides. Analogously, in the Fourier plane, the −1st order is subsequently blocked by the second light modulator, so that the 0th order and the +1st order interfere in the further course. In this case, the intensity profile in the axial direction is of interest, which is shown in FIG. 17 as a section in the xz plane. FIG. 17a) shows the intensity profile for the interference between the 0th order and the −1st order, FIG. 17b) the intensity profile for the interference between the 0th order and the +1st order. It can be clearly seen that the partial light distributions each have, as it were, an inclined axis, which is indicated by a dotted line in FIG. 17a) and FIG. 17b). If the two partial light distributions are superimposed in time, i.e. if they are irradiated with a short time gap into the same position of the sample, the intensity profile shown in FIG. 18a) results, again shown as a section in the xz-plane. As can be clearly seen, the superimposed light distribution also exhibits an intensity minimum in the axial direction, with regions with an intensity increase adjacent to it. As can be seen in FIG. 18b) and FIG. 18c), this intensity minimum can be shifted in the axial direction by shifting the two partial light distributions relative to each other in a lateral direction.

Figure 19:
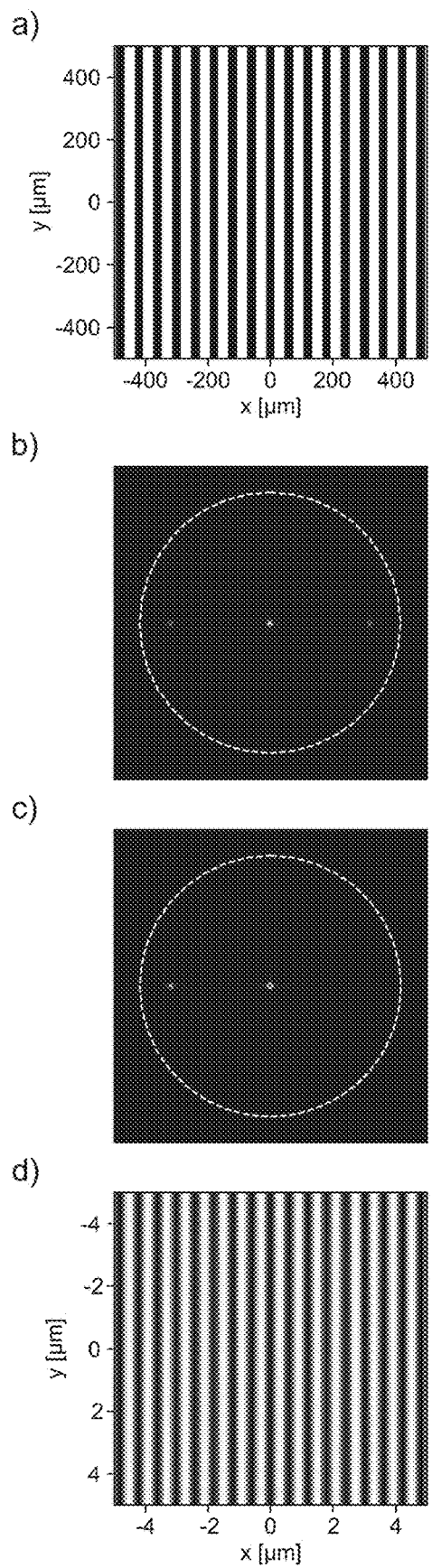
FIG. 19 shows an example of the generation of a light distribution of a sequence of light distributions.

FIG. 19 shows an example of the generation of a light distribution of a sequence of light distributions. FIG. 19a) shows the structures realized with the first light modulator, in this case a strip grating. FIG. 19b) shows the corresponding diffraction orders in the Fourier plane. There, in this example, the +1st order is blocked by the second light modulator, which is shown in FIG. 19c). In addition, the 0th order is attenuated such that the 0th order and the −1st order have essentially the same intensity. In the further course, the attenuated +0th order and the −1st order interfere, which in the plane of the sample, i.e. that of the xy-plane, leads to the interference patterns shown in FIG. 19d).

Figure 20:
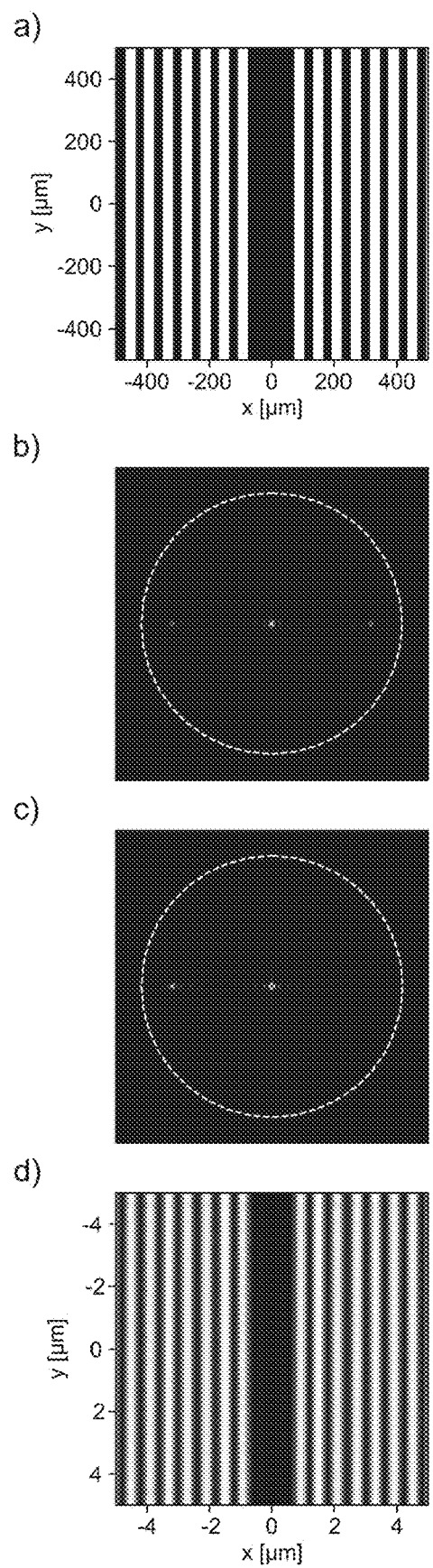
FIG. 20 shows an example of the generation of a locally modified light distribution of a sequence of light distributions.

FIG. 20 shows an example of the generation of a locally modified light distribution of a sequence of light distributions. As before, FIG. 20a) shows the strip grating realized with the first light modulator. In this case, however, two grating lines are switched off. FIG. 20b) shows the corresponding diffraction orders in the Fourier plane. There, in this example, the +1st order is blocked by the second light modulator and the 0th order is attenuated, which is shown in FIG. 20c). In the further course, the attenuated +0th order and the −1st order interfere, which in the plane of the sample, i.e. that of the xy-plane, leads to the interference patterns shown in FIG. 20d). As can be seen, switching off the grating lines results in corresponding gap in the pattern in the plane of the sample.

Figure 21:
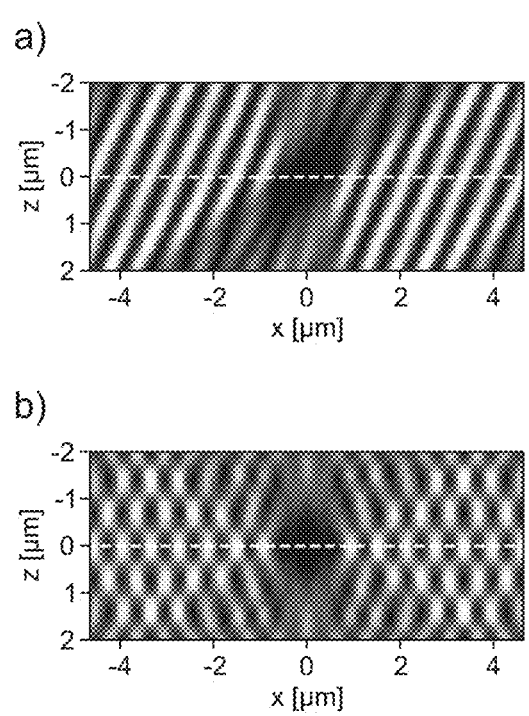
FIG. 21 shows a further example of the generation of a light distribution by a temporal superposition of different partial light distributions.

FIG. 21 shows a further example of the generation of a locally modified light distribution by a temporal superposition of different partial light distributions. In the same way as described above with reference to FIG. 16, a temporal superposition of different partial light distributions can be used with the locally modified light distributions. FIG. 21a) shows, as a section in the xz plane, a part of the intensity profile in the axial direction resulting from interference of the 0th order and the +1st order. A similar intensity profile results from interference of the 0th order and the −1st order. If the two partial light distributions are superimposed in time, i.e. if they are irradiated with a short time gap into the same position of the sample, the intensity profile shown in FIG. 21b) results, again shown as a section in the xz-plane. As can be clearly seen, the superimposed light distribution also exhibits an intensity minimum in the axial direction, with regions with an intensity increase adjacent to it.

REFERENCES

[1] F. Balzarotti et al.: "Nanometer resolution imaging and tracking of fluorescent molecules with minimal photon fluxes", Science, Vol. 355 (2017), pp. 606-612.
[2] M. G. L. Gustafsson: "Surpassing the lateral resolution limit by a factor of two using structured illumination microscopy", Journal of Microscopy, Vol. 198 (2000), pp. 82-87.
[3] M. G. L. Gustafsson: "Nonlinear structured-illumination microscopy: Wide-field fluorescence imaging with theoretically unlimited resolution", Proceedings of the National Academy of Sciences, Vol. 102 (2005), pp. 13081-13086.
[4] L. Gu et al.: "Molecular resolution imaging by repetitive optical selective exposure", Nature Methods, Vol. 16 (2019), pp. 1114-1118.
[5] L. Reymond et al.: "SIMPLE: Structured illumination based point localization estimator with enhanced precision", Optics Express, Vol. 27 (2019), pp. 24578-24590.
[6] J. Cnossen et al.: "Localization microscopy at doubled precision with patterned illumination", Nature Methods, Vol. 17 (2020), pp. 59-63.

LIST OF REFERENCE SIGNS

1 Sample
2 Molecule
3 Coherent light
4 Light distribution
5 Intensity minimum
6 Region with intensity increase
7 First light modulator
8 Pixel
9 Structure
10 Structural element
11 Image plane
12 Second light modulator
13 Fourier plane
14 Lens
15 Light source
16 Detector unit
17 Beamsplitter
20 Apparatus
21 Interface
22 Operating unit
23 Evaluation unit
24 Control unit
25 Memory
26 User interface
30 Apparatus
31 Memory
32 Processor
33 Input
34 Output
40 Microscope
41 Dichroic mirror
42 Polarization rotating element
43 Quarter wave plate
44 Neutral density filter
45 Segmented polarizer
46 Objective
47 Filter
50 Apparatus
51 Interface
52 Operating unit
53 Evaluation unit
54 Control unit
55 Memory
56 User interface
60 Apparatus
61 Memory
62 Processor
63 Input
64 Output
$P_1$ Position
S1 Generate light distributions
S2 Illuminate molecules with light distributions
S3 Position light distributions independently of each other
S3' Locally modify light distributions
S4 Detect emitted photons
S5 Derive positions of molecules based on emitted photons

The invention claimed is:

1. A method for determining positions of two or more spaced-apart molecules in one or more spatial directions in a sample using a localization microscope, wherein light distributions arising due to interference of coherent light are used for determining the positions of the molecules, comprising:
generating a plurality of light distributions using a first light modulator having a plurality of switchable pixels disposed in an image plane of the localization microscope, each light distribution having at least one local intensity minimum and regions with an intensity increase adjacent thereto;
illuminating each of the two or more molecules with one light distribution each;
for each of the light distributions, detecting photons emitted by the molecules for different positionings of the light distribution, the light distributions being positioned independently of each other; and
deriving the positions of the molecules based on the photons detected for the different positionings of the light distributions.

2. The method according to claim 1, wherein grating structures or ring structures are formed by means of the switchable pixels of the first light modulator for generating the light distributions.

3. The method according to claim 2, wherein the structures formed by means of the switchable pixels of the first light modulator are shifted for positioning the light distributions.

4. A method for determining positions of two or more spaced-apart molecules in one or more spatial directions in a sample using a localization microscope, wherein light distributions arising due to interference of coherent light are used for determining the positions of the molecules, comprising:
generating a sequence of light distributions using a first light modulator having a plurality of switchable pixels disposed in an image plane of the localization microscope, each light distribution having local intensity minima and regions with an intensity increase adjacent thereto, wherein subsequent light distributions are locally modified in accordance with estimated positions of the molecules;
illuminating the two or more molecules with the sequence of light distributions;
for each of the light distributions, detecting photons emitted by the molecules; and
deriving the positions of the molecules based on the photons detected for the different light distributions.

5. The method according to claim 4, wherein for generating the light distributions a grating structure is formed by means of the switchable pixels of the first light modulator, and wherein subsequent light distributions are locally modified by switching off individual grating lines of the grating structure.

6. The method according to claim 5, wherein those grating lines or groups of grating lines are switched off that cause an intensity at an estimated position of a molecule that exceeds a threshold.

7. The method according to claim 5, wherein the grating structure formed by means of the switchable pixels of the first light modulator is shifted for subsequent light distributions.

8. The method according to claim 1, wherein a second light modulator for influencing the light distributions is arranged in a Fourier plane of the localization microscope, which is arranged to block individual diffraction orders.

9. The method according to claim 1, wherein the first light modulator is an amplitude modulator or a phase modulator.

10. The method according to claim 2, wherein for successive position determinations with a light distribution, an intensity profile of the light distribution is changed by changing a structural property of the associated grating structure or ring structure.

11. The method according to claim 1, wherein the light distributions result from a temporal superposition of different partial light distributions.

12. The method according to claim 11, wherein the partial light distributions result from the interference of different diffraction orders generated by the first light modulator.

13. The method according to claim 1, wherein a marker in the sample is detected using at least one light distribution for determining a drift.

14. The method according to claim 1, wherein a drift is determined from changes in the same direction in the measured positions of molecules in successive measurements.

15. The method according to claim 1, wherein the photons emitted by the molecules are detected using a camera or an array of photon counters.

16. An apparatus for determining positions of two or more spaced-apart molecules in one or more spatial directions in a sample using a localization microscope, wherein light distributions arising due to interference of coherent light are used for determining the positions of the molecules, comprising:
an operating unit adapted to drive a first light modulator having a plurality of switchable pixels, which is disposed in an image plane of the localization microscope, to generate a plurality of independently positionable light distributions, each light distribution having at least one local intensity minimum and regions with an intensity increase adjacent thereto; and
an evaluation unit adapted to derive the positions of the molecules on the basis of photons emitted by the molecules for each of the light distributions for different positionings of the respective light distributions.

17. An apparatus for determining positions of two or more spaced-apart molecules in one or more spatial directions in a sample using a localization microscope, wherein light distributions arising due to interference of coherent light are used for determining the positions of the molecules, comprising:
an operating unit adapted to drive a first light modulator having a plurality of switchable pixels, which is disposed in an image plane of the localization microscope, to generate a sequence of light distributions, each light distribution having local intensity minima and regions with an intensity increase adjacent thereto, wherein subsequent light distributions are locally modified in accordance with estimated positions of the molecules; and
an evaluation unit adapted to derive the positions of the molecules on the basis of photons emitted by the molecules for the different light distributions.

18. A microscope, with:
a light source for generating coherent light;
a first light modulator having a plurality of switchable pixels, which is disposed in an image plane of the microscope for generating a plurality of light distributions arising due to interference of coherent light, each light distribution having at least one local intensity minimum and regions with an intensity increase adjacent thereto;
optical means for illuminating two or more spaced-apart molecules in a sample with one light distribution each;
a detector unit for detecting photons emitted by the molecules for each of the light distributions for different positionings of the light distributions, the light distributions being positionable independently of each other; and
an apparatus according to claim 17 for determining positions of the two or more molecules in one or more spatial directions.

19. A microscope, with:
a light source for generating coherent light;
a first light modulator having a plurality of switchable pixels, which is disposed in an image plane of the microscope for generating a sequence of light distributions arising due to interference of coherent light, each light distribution having local intensity minima and regions with an intensity increase adjacent thereto, wherein subsequent light distributions are locally modified in accordance with estimated positions of the molecules;
optical means for illuminating two or more spaced-apart molecules in a sample with the light distributions;
a detector unit for detecting photons emitted by the molecules for the different light distributions; and
an apparatus according to claim 18 for determining positions of the two or more molecules in one or more spatial directions.

20. The method according to claim 4, wherein a second light modulator for influencing the light distributions is arranged in a Fourier plane of the localization microscope, which is arranged to block individual diffraction orders.

21. The method according to claim 4, wherein the first light modulator is an amplitude modulator or a phase modulator.

22. The method according to claim 5, wherein for successive position determinations with a light distribution, an intensity profile of the light distribution is changed by changing a structural property of the associated grating structure or ring structure.

23. The method according to claim 4, wherein the light distributions result from a temporal superposition of different partial light distributions.

24. The method according to claim 4, wherein a drift is determined from changes in the same direction in the measured positions of molecules in successive measurements.

25. The method according to claim 4, wherein the photons emitted by the molecules are detected using a camera or an array of photon counters.

* * * * *